United States Patent
Biala et al.

(10) Patent No.: US 11,473,917 B2
(45) Date of Patent: Oct. 18, 2022

(54) SYSTEM FOR AUGMENTING AUTONOMOUS VEHICLE PERCEPTION USING SMART NODES

(71) Applicant: Argo AI, LLC, Pittsburgh, PA (US)

(72) Inventors: Ilan Biala, Pittsburgh, PA (US); Michel Laverne, Pittsburgh, PA (US); Brett Browning, Pittsburgh, PA (US)

(73) Assignee: Argo AI, LLC, Pittsburgh, PA (US)

( * ) Notice: Subject to any disclaimer, the term of this patent is extended or adjusted under 35 U.S.C. 154(b) by 186 days.

(21) Appl. No.: 16/928,893

(22) Filed: Jul. 14, 2020

(65) Prior Publication Data

US 2022/0018663 A1    Jan. 20, 2022

(51) Int. Cl.
| | |
|---|---|
| *H04L 29/08* | (2006.01) |
| *G01C 21/34* | (2006.01) |
| *G08G 1/00* | (2006.01) |
| *G06F 16/9537* | (2019.01) |
| *H04L 67/12* | (2022.01) |
| *G06F 16/29* | (2019.01) |
| *G08G 1/01* | (2006.01) |

(52) U.S. Cl.
CPC ......... *G01C 21/3407* (2013.01); *G06F 16/29* (2019.01); *G06F 16/9537* (2019.01); *G08G 1/0133* (2013.01); *G08G 1/22* (2013.01); *H04L 67/12* (2013.01)

(58) Field of Classification Search
CPC . G01C 21/3407; G06F 16/29; G06F 16/9537; G08G 1/0133; G08G 1/22; H04L 67/12
See application file for complete search history.

(56) References Cited

U.S. PATENT DOCUMENTS

| | | |
|---|---|---|
| 6,792,345 B2 | 9/2004 | Matsumoto et al. |
| 8,300,564 B2 | 10/2012 | Grimm et al. |

(Continued)

FOREIGN PATENT DOCUMENTS

WO    2020103754 A1    5/2020

OTHER PUBLICATIONS

U.S. Appl. No. 16/928,844, filed Jul. 14, 2020, Smart Node for Autonomous Vehicle Perception Augmentation.

(Continued)

*Primary Examiner* — Kim T Nguyen
(74) *Attorney, Agent, or Firm* — Fox Rothschild LLP

(57) ABSTRACT

A system provides navigational control information to a fleet of vehicles and includes a network of nodes within a geographical area. Each node is located at a different intersection in the geographical area. Each node includes a node vision range and a processor which generates augmented perception data (APD) for each moving object of interest monitored in the node vision range. The system includes a remote server system that includes a database of the APD and receives a query from a vehicle of the fleet for the APD associated with an imminent path of the vehicle. The server system, in response to the query, searches the database for APD associated with the imminent path, and communicates, over a communication network, the resultant APD associated with the imminent path to the vehicle. The APD controls navigation of the vehicle through one or more imminent intersections along the imminent path.

20 Claims, 21 Drawing Sheets

(56) References Cited

U.S. PATENT DOCUMENTS

| | | |
|---|---|---|
| 9,769,865 B2 | 9/2017 | Blanksby et al. |
| 10,140,527 B2 | 11/2018 | Han et al. |
| 11,225,247 B2 | 1/2022 | Beller et al. |
| 2013/0325342 A1 | 12/2013 | Pylappan et al. |
| 2017/0277195 A1 | 9/2017 | Frazzoli et al. |
| 2017/0329332 A1 | 11/2017 | Pilarski et al. |
| 2018/0319280 A1 | 11/2018 | Kim et al. |
| 2019/0176828 A1 | 6/2019 | Weiser |
| 2019/0304310 A1* | 10/2019 | Tao .................. G01S 13/931 |
| 2020/0024922 A1 | 1/2020 | Zhang et al. |
| 2020/0065711 A1 | 2/2020 | Clement et al. |
| 2020/0074852 A1* | 3/2020 | Hu .................. G06V 20/56 |
| 2020/0183416 A1 | 6/2020 | Cheng et al. |
| 2020/0394910 A1 | 12/2020 | Malhan et al. |
| 2020/0410263 A1 | 12/2020 | Gao |
| 2021/0026360 A1 | 1/2021 | Luo |
| 2021/0052557 A1 | 2/2021 | Borody |
| 2021/0053558 A1 | 2/2021 | Costa et al. |
| 2021/0134151 A1 | 5/2021 | Khalid |
| 2021/0233396 A1 | 7/2021 | Guo et al. |
| 2022/0017115 A1 | 1/2022 | Biala et al. |
| 2022/0018663 A1 | 1/2022 | Biala et al. |
| 2022/0019225 A1 | 1/2022 | Foley et al. |
| 2022/0020271 A1 | 1/2022 | Foley et al. |
| 2022/0148221 A1 | 5/2022 | Wagner et al. |
| 2022/0165010 A1 | 5/2022 | Foley et al. |

OTHER PUBLICATIONS

U.S. Appl. No. 16/928,861, filed Jul. 14, 2020, Method and System for Vehicle Navigation Using Information from Smart Node.
U.S. Appl. No. 16/928,883, filed Jul. 14, 2020, Smart Node Network for Autonomous Vehicle Perception Augmentation.
Bergmann, P. et al., "Tracking Without Bells and Whistles", Proc. of the IEEE International Conference on Computer Vision (ICCV), Seoul, Korea, Oct. 2019.
Bhandari, R. et al., "DeepLane: Camera-assisted GPS for Driving Lane Detection", Computer Science Proceedings of the 5th Conference on Systems for Built Environments, (2018) pp. 73-82.
Hasan, M. et al., "Securing Vehicle-to-Everything (V2X) Communication Platforms," arXiv:2003.07191v1 [cs.NI] Mar. 12, 2020, pp. 1-21.
Guo, J. et al., "Vehicular Ad Hoc Networks and Dedicated Short-Range Communication," University of Michigan—Dearborn, Jun. 26, 2006. pp. 1-56.
Silwa, B. et al., "A Reinforcement Learning Approach for Efficient Opportunistic Vehicle-to-Cloud Data Transfer," Communication Networks Institute, TU Dortmund University, arXiv:2001.05321v1 [cs.NI] Jan. 15, 2020.
Smith, "First interactive 360-degree music video arrives on YouTube", Mar. 26, 2015 https://www.trustedreviews.com/news/first-interactive-360-degree-music-video-arrives-on-youtube-2924944.

* cited by examiner

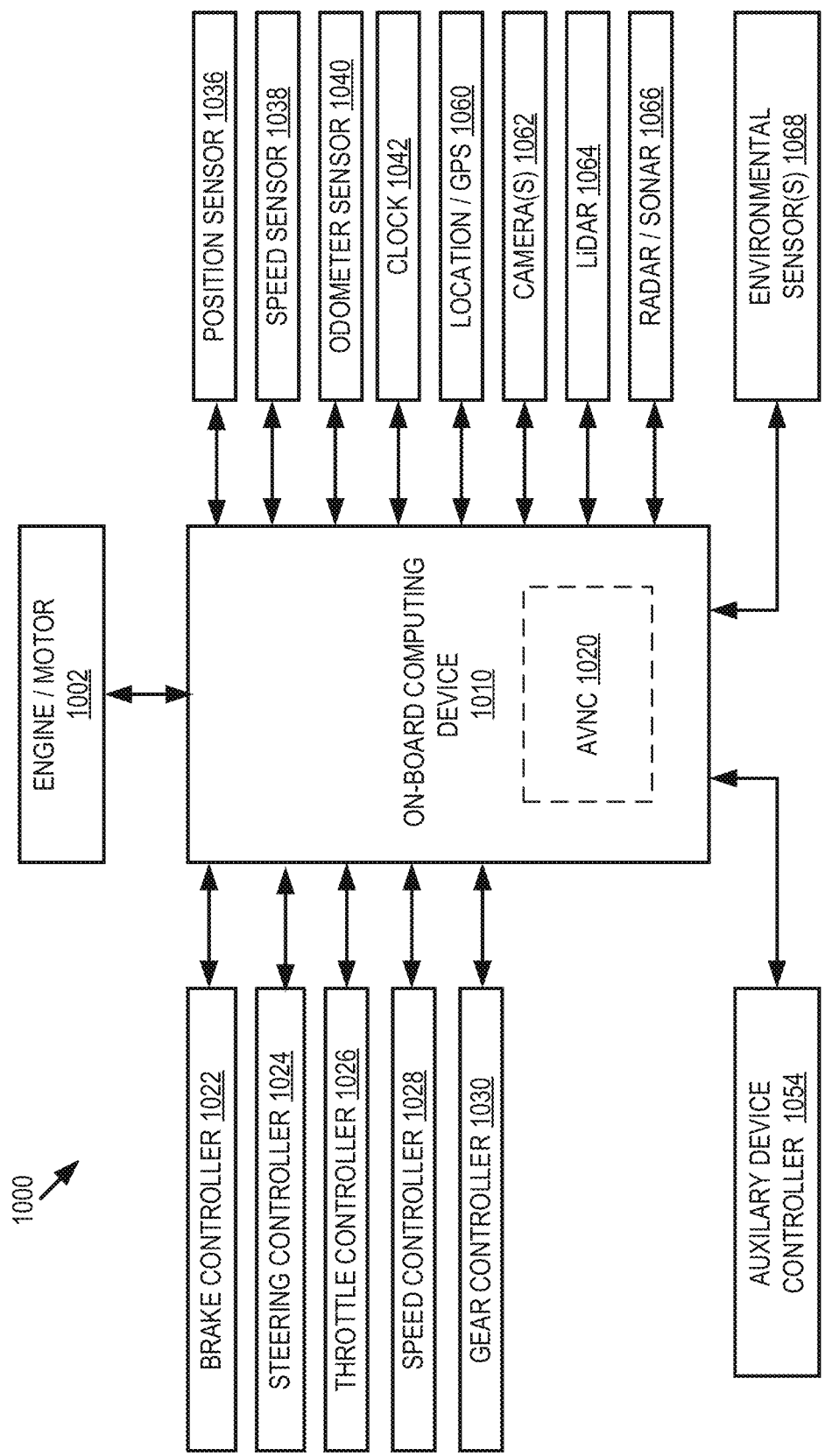

SYSTEM FOR AUGMENTING AUTONOMOUS VEHICLE PERCEPTION USING SMART NODES

BACKGROUND

The document describes methods and systems that are directed to capturing images of a driving environment and using those images to help autonomous vehicles navigate in the environment.

Intersections are challenging for autonomous vehicles and human drivers alike. The traffic patterns are complex and there are occlusions from static structure (such as buildings, terrain, vegetation, or signs) and dynamic objects (such as cars, buses, or large trucks). While humans may rely on subtle clues in the environment (such as headlight reflections or shadows), or in some cases a specific piece of infrastructure to perceive activities around intersections despite some "blind spots" or hidden or occluded objects.

Therefore, for at least these reasons, a better method of navigational control of a vehicle through an intersection is needed.

SUMMARY

In various embodiments, a system provides navigational control information to a fleet of vehicles. The system includes a network of nodes distributed within a geographical area. Each node is located at a different intersection in the geographical area. Furthermore, each node includes a computer vision system with a node vision range, a processor, and a computer-readable storage medium including programming instructions that are configured to, when executed, cause the processor to generate augmented perception data that includes location data in a global coordinate system and motion data for each moving object of interest monitored in the node vision range by the computer vision system. The system includes a remote server system including a database of the augmented perception data associated with the network of nodes and a server. The server receives a query from a vehicle of the fleet of vehicles for the augmented perception data associated with an imminent path of the vehicle. The server, in response to the query, searches the database for resultant augmented perception data associated with the imminent path. The server communicates, over a wireless communication network, the resultant augmented perception data associated with the imminent path to the vehicle. The augmented perception data can be used to control navigation of the vehicle through one or more imminent intersections along the imminent path.

In some embodiments, the remote server system may include a gateway server that is configured to receive, from an external traffic control infrastructure, traffic light states for traffic light devices at each intersection with at least one traffic light device of the geographical area. The remote server system may include a second database of the traffic light states for the traffic light devices in the geographical area.

In some embodiments, the gateway server may also be configured to receive traffic condition information associated with roads of the geographical area monitored by the external traffic control infrastructure. The system may also include a third database that includes the received traffic condition information.

In some embodiments, the gateway server may be configured to receive a query from the vehicle of the fleet of vehicles for the traffic condition information associated with a planned route of the vehicle. The gateway server may also search for the traffic condition information associated with the planned route in the third database, in response to the query for the traffic condition information.

In some embodiments, the gateway server may also receive a query from the vehicle of the fleet of vehicles for the traffic light states for those traffic light devices along a planned route of the vehicle. The gateway server may also search for the traffic light states associated with the planned route in the database of the traffic light states, in response to the query for the traffic light states.

In some embodiments, the gateway server may also communicate, over the wireless communication network, to the vehicle the traffic light states associated with the planned route. The traffic light states control the navigation of the vehicle along the planned route.

In some embodiments, the traffic light states associated with the planned route may be configured to update a traffic light classifier associated with the vehicle to control navigation of the vehicle through one or more intersections along the planned route.

In some embodiments, the server may also fuse the augmented perception data from adjacent nodes of the network of nodes in response to the search. Each adjacent node may have a respective different node vision range associated with the imminent path.

In some embodiments, the resultant augmented perception data associated with the imminent path may include the fused augmented perception data from the adjacent nodes of the network of nodes.

In some embodiments, the remote server system may be configured to communicate to the vehicle, the traffic light states associated with a planned route of the vehicle. The traffic light states may update a traffic light classifier associated with the vehicle to control navigation of the vehicle through one or more intersections along the planned route. The remote server system may be configured to communicate traffic condition information associated with roads of the planned route. The traffic condition information may update the planned route. The imminent path is an un-driven portion of at least one of the planned route or updated route.

BRIEF DESCRIPTION OF THE DRAWINGS

FIG. 10 illustrates example systems and components of an autonomous vehicle.

DETAILED DESCRIPTION

In this document, when terms such as "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

In this document: (i) the term "comprising" means "including, but not limited to"; the singular forms "a," "an," and "the" include plural references unless the context clearly dictates otherwise; and (iii) unless defined otherwise, all technical and scientific terms used in this document have the same meanings as commonly understood by one of ordinary skill in the art. Also, terms such as "top" and "bottom", "above" and "below", and other terms describing position are intended to have their relative meanings rather than their absolute meanings with respect to ground. For example, one structure may be "above" a second structure if the two structures are side by side and the first structure appears to cover the second structure from the point of view of a viewer (i.e., the viewer could be closer to the first structure).

Many current commercial solutions for traffic detections use extremely naive approaches. When they are camera based, they are based on traditional image processing (background subtraction, lane occupancy), or use different sensing modalities (ground loops, radar).

While the current systems are extremely expensive and costly to deploy and maintain, the smart node system described in this document and its associated sensing may be by design low-cost to enable a rapid and cost-effective deployment. This is achieved by improving the computing architecture and relying on a cost-effective sensor which this document may refer to as a "smart node." Each node is configured to perceive activities around an intersection and provide an autonomous vehicle information which may be in "blind spots" of, or hidden from the vehicle's computer vision system.

Before describing the system in detail, it is helpful to establish a few acronyms:

APD=augmented perception data;
AV=autonomous vehicle;
AVDS=autonomous vehicle driving system;
CVS=computer vision system;
FOV=field of view;
GLS=geographic location system;
GPS=Global Positioning System;
GPU—graphics processing unit;
OOI=object of interest;
TL=traffic light;
VR=vision range.

These terms will also be defined when first used below.

Figure 1:
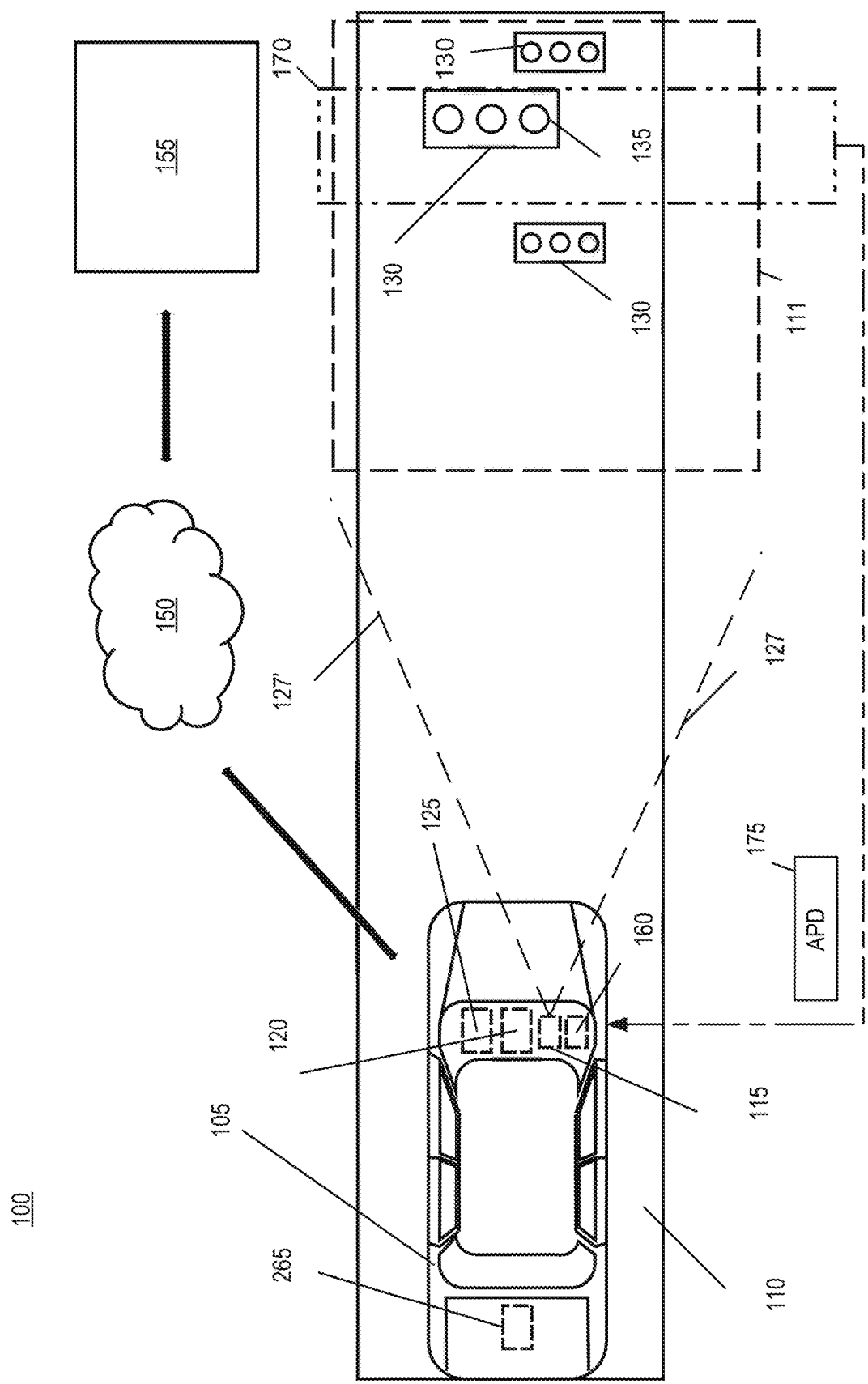
FIG. 1 illustrates an example system using smart nodes for autonomous perception augmentation, in accordance with various embodiments of the present disclosure.
Figure 3:
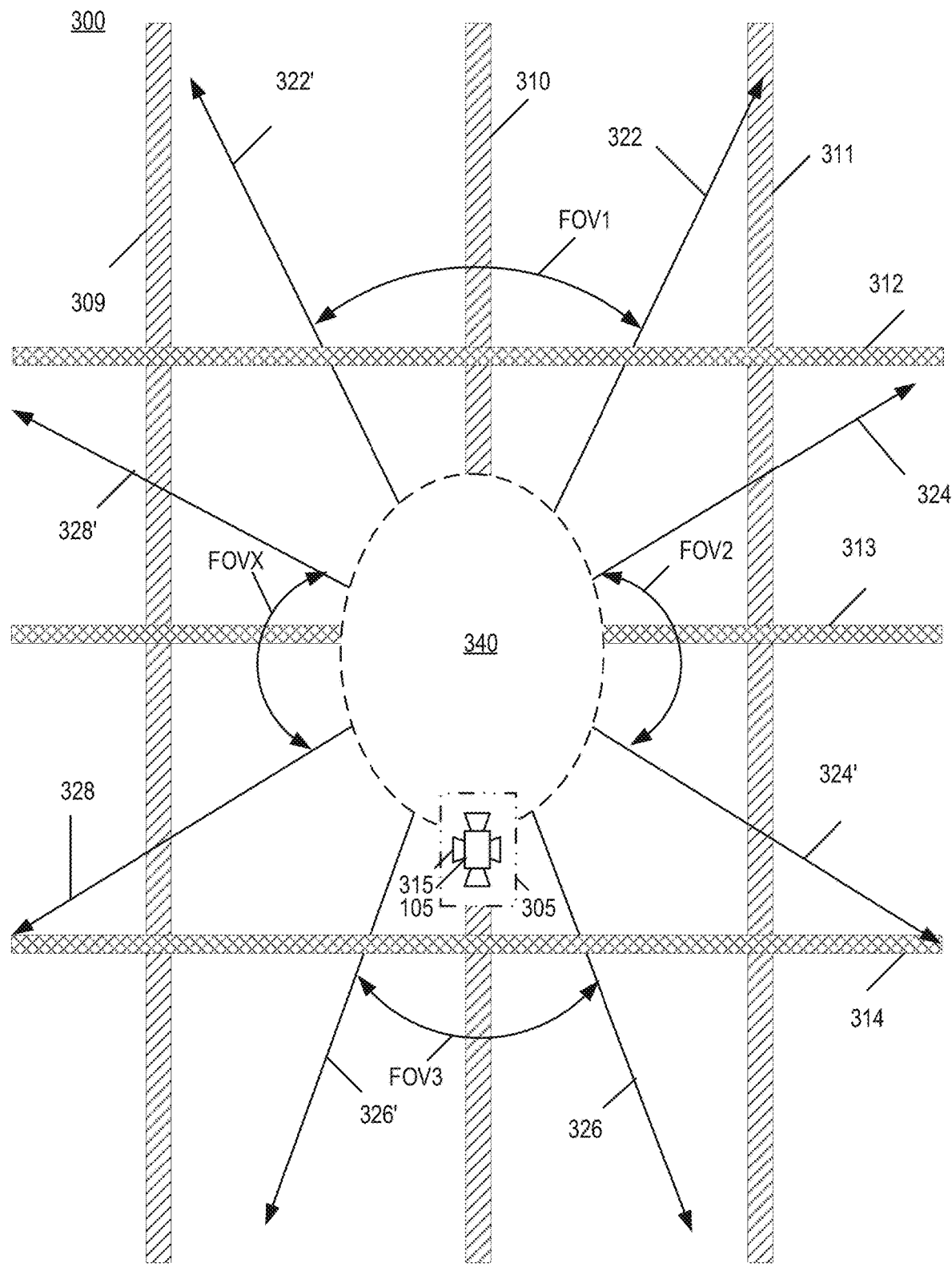
FIG. 3 illustrates a horizontal field of view pattern of a node computer vision system.
Figure 4:
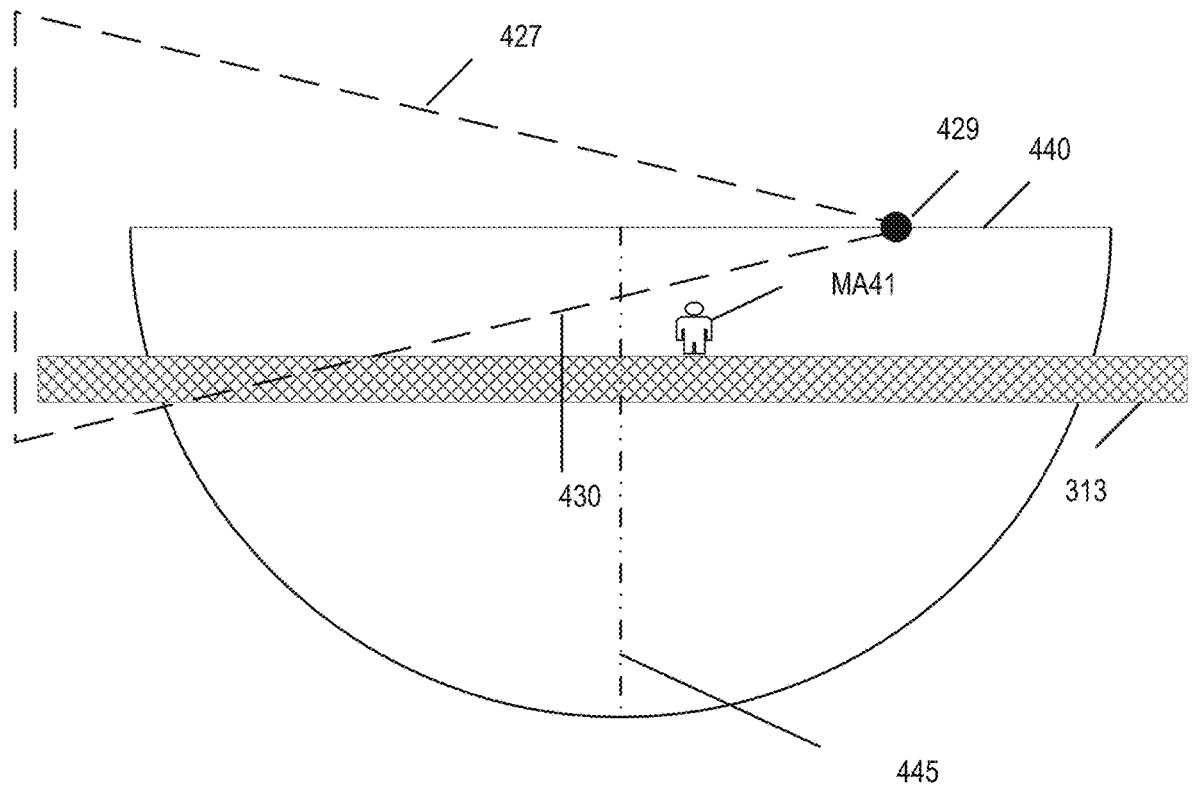
FIG. 4 illustrates a vertical field of view pattern of a node computer vision system.

Referring now to FIG. 1, a system 100 using smart nodes for autonomous vehicle perception augmentation is provided. As shown in FIG. 1, the system 100 may include at least one smart node 170 (only one shown), denoted in a box with dash, dot, dot lines. The smart node will be described in more detail in FIG. 2 below. Each smart node 170 may be installed on a structure at or near an intersection. By way of non-limiting example, the smart node 170 may be installed on a traffic light post or traffic light gantry, a building or other structure at the intersection of roads. The smart node 170 includes a node CVS 205, as will be discussed in more detail in relation to FIG. 2. The node CVS 205 may include directional and omni-directional image capture devices to define a node's VR, as shown in FIGS. 3-4. The node CVS 205 includes one or more processing channels 620, as will be described in more detail in relation to FIG. 6A, which may be implemented using hardware, firmware, software or a combination of any of these. For instance, the node CVS processing channels 620 may be implemented as part of a microcontroller, processor, and/or graphics processing units. The processing channels 620 may include or interface with a register and/or data store for storing data and programming instructions, which when executed, performs image signal processing, feature extraction, OOI detection, OOI classification, OOI motion tracking and OOI motion forecasting and/or the like. The node CVS 205 may interface directional and omni-directional image capture devices (i.e., intersection direction cameras 207 and wide FOV camera 210) with the node CVS processing channels 620.

In some embodiments, the smart node 170 comprises a combination of cameras and computing hardware which may be situated near an intersection (e.g., mounted on traffic light gantries). The smart node 170 may be configured to detect, classify and track multiple actors and objects (including, for example: vehicles, pedestrians, and cyclists) in its fields of view (FOVs). The smart node 170 may forecast a moving actor or moving object's motion, based on real time images captured in the FOVs and communicate the forecast to at least one vehicle 105 in-range and/or passing through the intersection. A smart node 170 can be interconnected to provide local APD 175 which may also be used with city-wide information pertinent to routing and planning of the vehicle 105. The terms "APD" and "APD information" may be used interchangeably herein.

The vehicle 105 may be an AV as shown driving along the road 110. In some embodiments, the vehicle 105 may be a semi-autonomous vehicle. As the vehicle 105 drives, a vehicle CVS 115 incorporated into the vehicle 105 is configured to receive a digital image of at least one traffic signal device 130 and other objects in the environment while driving along a path or route and passing through an intersection. The vehicle CVS 115 may include one or more cameras for capturing digital images of various features of the environment in which the vehicle 105 is traveling, along with a processor and software for processing images and identifying objects of interest in the images, to define a vehicle's VR.

The term "route" as used herein means the overall or end-to-end path from point A (point of origination) to point B (point of destination) that the vehicle will travel to arrive at the point of destination. The term "path" means the immediate or imminent path the vehicle intends to take over the next L meters along the "route," where L is a non-zero number. The term "path" as used herein represents the un-traveled portion of the route and will sometimes be referred to as an "imminent path." Once navigation of the vehicle begins to proceed along the route a particular distance, that traveled distance of the route may sometimes be referred to as a "traveled portion."

Each camera includes a FOV, only one field of view is shown and denoted by dashed lines 127 and 127' for the sake of illustration. Such captured features may include one or more traffic signal devices 130 and at least one of OOI (i.e., moving actors, moving objects, moving vehicles, stationary objects, and stationary vehicles) in the environment. However, as the vehicle 105 moves within an environment, each moving actor, moving object and moving vehicle needs to be registered, classified and tracked to determine their motion, such as location, direction and speed of moving. The APD may include the classification of the OOI, which may be used locally by the vehicle for local vehicle navigation and control. However, the classification of the OOI may be used by a remote server system 155 for use in city-wide motion planning, as will be described in more detail herein. The remote server system 155 may include one or more servers and memory.

The system 100 may include the vehicle CVS 115 incorporated into the vehicle 105. The road 110 and lane traffic light control 111 may be separate from the system 100 and part of the environment. The lane traffic light control 111 may include one or more traffic signal devices 130. The lane traffic light control 111 is denoted in a dashed box. The system 100 may include a GLS 160 configured to determine a location and orientation of the vehicle 105. The GLS 160 may include a GPS device. The GLS 160 may be implemented using hardware, firmware, software or a combination of any of these. For instance, GLS 160 may be implemented as part of a microcontroller and/or processor with a register and/or data store for storing data and programming instructions, which when executed, determines a location and orientation of the vehicle. It is noted, however, that other forms of geographic location determination systems may additionally, or alternatively, be used. The GLS 160 may be incorporated into the vehicle 105. A respective one smart node 170 is shown located at or near the lane traffic control 111, as in a scenario the smart node 170 may be mounted on the traffic light gantry radiating from a pole at an intersection.

The system 100 may further include a transceiver 120 incorporated in the vehicle 105. The transceiver 120 may include a transmitter and receiver configured to send and receive digital information from a remote server system 155 via a wired and/or wireless connection such as, for example, through the Internet 150, where the vehicle 105 and the remote server system 155 are in electronic communication with each other. The remote server system 155 may be part of a cloud computing system. The system 100 may further include a processor 125. The processor 125 may be configured to represent the traffic signal device 130 and other objects as a raster image. It is noted that the processor 125 may be a standalone processor, the vehicle's processor, and/or the remote server's processor. Data processed by the processor 125 may be data received from the vehicle 105, received from the remote server system 155, received from any number of smart nodes 170 and/or a combination of data from the vehicle 105, the smart nodes 170 and the remote server system 155. However, for the sake of illustration, the processor 125 is represented incorporated in the vehicle 105. The vehicle 105 may include a standalone processor (e.g., processor 125) and/or at least one separate vehicle processor.

According to various embodiments, the system 100 may include the vehicle 105. The vehicle 105 may include an autonomous vehicle driving system (AVDS) 265 for a fully autonomous vehicle or semi-autonomous vehicle with a computer-assisting driving system to assist a human operator of the vehicle. The AVDS 265 may be implemented using hardware, firmware, software or a combination of any of these. For instance, AVDS 265 may be implemented as part of a microcontroller and/or processor with a register and/or data store for storing data and programming instructions, for autonomous vehicle driving, route navigation and collision avoidance and/or the like.

The AVDS 265 may control a braking system (not shown), engine system (not shown), and/or steering system (not shown) of the vehicle 105 in response to at least one control signal representative of the classification state of the current instantiation of a traffic signal device 130, for example, as will be described in more detail in relation to FIG. 11. The AVDS 265 may control a braking system (not shown), engine system (not shown), and/or steering system (not shown) of the vehicle 105 in response to at least one control signal representative of other automated navigational control of the vehicle 105 to stop, accelerate, decelerate and/or turn a vehicle 105 along a driven route.

The AVDS 265 may include a system architecture 1000 as will be described in more detail in relation to FIG. 10. The system architecture 1000 is configured to carry out other autonomous driving functions of the AVDS 265, for example. Some of the components of the AVDS 265 may include programming instructions to carry out the functions described herein which may be executed by processor 125 (FIG. 1), the processor of the server system 155 (FIG. 1), or the processor of the vehicle on-board computing device 1010 (FIG. 10).

The system 100 may be configured to provide descriptions of the different actors in an intersection, with different classes of objects, location, heading, velocity and other relevant information that may be used to help guide a vehicle 105 which is at or near or approaching the intersection monitored by the smart node 170. For a more precise integration with the AVDS of the vehicle 105, the smart node 170 may express the collected data in a reference frame common to the AVDS of the vehicle 105 and the node 170, likely through the use of high definition maps.

As will be seen from the description herein, the vehicle CVS of the vehicle, receives at least one digital image of an environment along a planned route. The vehicle CVS has a vehicle's VR which is generally updated as the vehicle moves. A processor of the vehicle detects, in the at least one digital image, a first set of OOIs and determines motion of each OOI in the first set of OOIs. The vehicle or processor receives APD associated with an in-range node to and along a portion (i.e., the imminent path) of the planned route, the in-range node has a node CVS. The received APD identifies motion of each OOI of a second set of OOIs detected within a node's VR. The vehicle's VR and the node's VR are different vision ranges. The processor of the vehicle controls motion of the vehicle to and along the portion (i.e., the imminent path) of the planned route based on a fusion of the first set of OOIs and the second set of OOIs.

Figure 2:
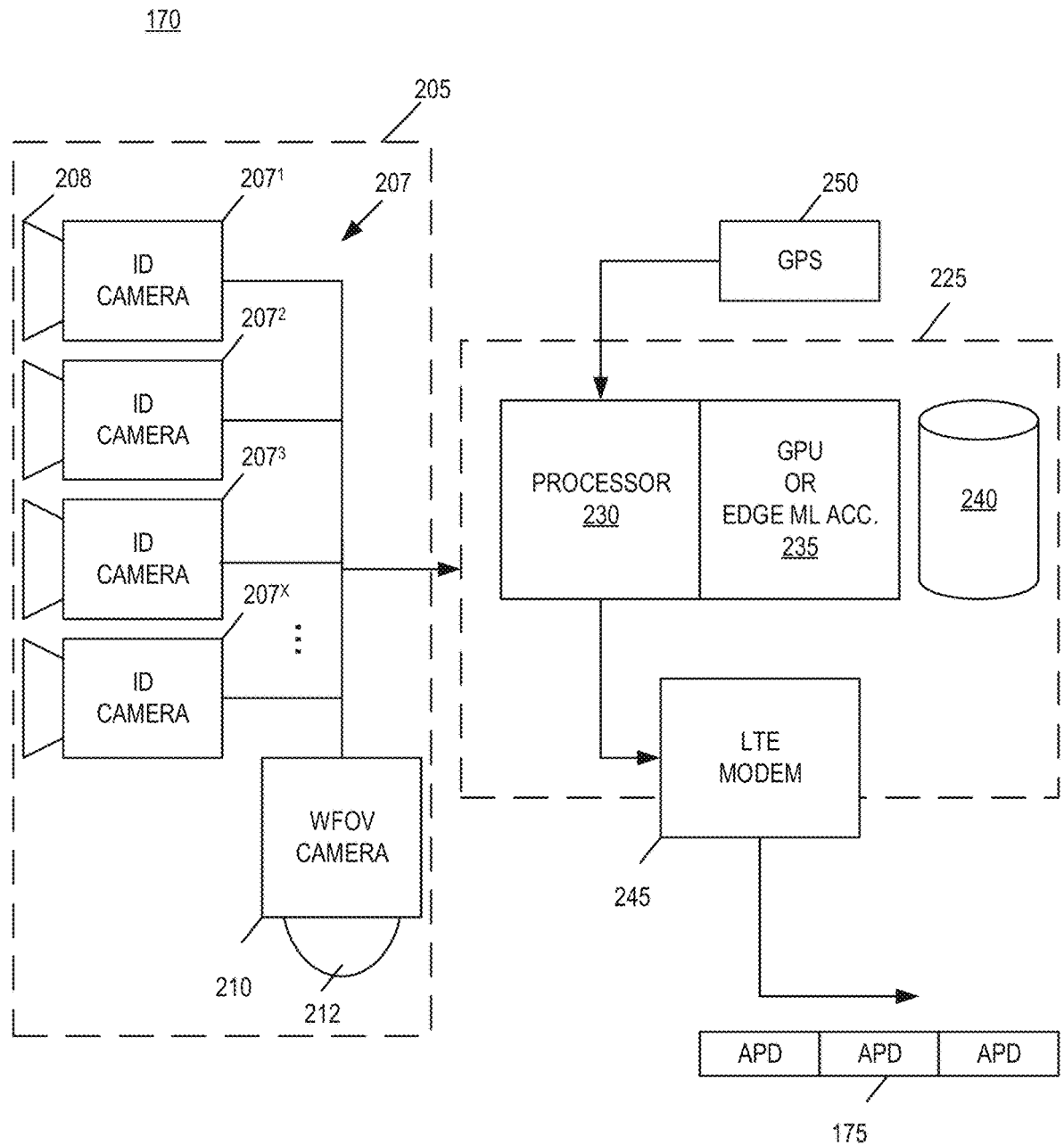
FIG. 2 illustrates an example of a smart node.

FIG. 2 illustrates an example of a smart node 170. The node CVS 205 of the smart node 170 may include multiple intersection direction cameras 207, which include multiple cameras pointed in various directions to capture images of various traffic pathways approaching the intersection and/or other areas near the intersection such as sidewalks or parking lanes. Each intersection direction camera 207 may have a narrow field of view (narrow FOV) to focus on a particular area of traffic approaching the intersection, such as a single lane or group of lanes. Each intersection direction camera 207 may include a lens 208 operatively coupled to an imaging sensor. The smart node 170 may include a wide field of view (wide FOV) camera 210. In this context, the terms "narrow" and "wide" are meant to be relative to each other, so that the wide FOV camera 210 has a field of view that is wider than that of any narrow FOV camera 207. Thus, the node CVS 205 may have multiple fields of view. For example, the narrow FOV of each intersection direction camera 207 may correspond to a unique lane or other unique segment of the intersection, while the wide FOV camera 210 may capture an image of all, or substantially all, of the lanes or other segments. Note that the narrow FOVs of some of the intersection direction cameras may overlap to some extent with the FOVs of one or more other intersection direction cameras, so long as the complete field of view of any individual intersection direction camera is unique and does not match that of the other intersection direction cameras.

In some instances, the wide FOV camera 210 may include a convex lens 212. The lens may be configured to create a hemispherical image. The convex lens 212 may include a fisheye lens or a hemispherical lens. In other embodiments, the lens 212 may include multiple lenses configured to create a panoramic image in 360°, for example, from multiple wide angle images that can be stitched together. The convex lens 212 may comprise a principle axis 445 (FIG. 4) configured to be oriented in a vertical direction and pointed in a field which is below the gantry supporting the traffic signal device. In a scenario, the intersection direction cameras 207 may include intersection direction cameras $207^1$, $207^2$, $207^3$, ..., $207^X$ where X is a non-zero integer and equal to the number of roads emanating from the intersection, as will be described in relation to FIG. 3. In some scenarios, a road may support two-way traffic lanes or pathways. An intersection may control four (X=4) intersection directions (roads) by the traffic light control 111. In another scenario, the X may be greater or less than 4 as pathways may branch off into another road or a road of an intersection may terminate.

The multiple FOVs will be described in more detail in relation to FIGS. 3 and 4 where a field of view of the wide FOV camera 210 may overlap a portion of the FOVs of the intersection direction cameras $207^1$, $207^2$, $207^3$, ..., $207^X$. The smart node 170 may include a node controller 225 in communication (wired or wireless) with the node CVS 205. The node controller 225 may be implemented using hardware, firmware, software or a combination of any of these. For instance, node controller 225 may be implemented as part of a microcontroller and/or processor with a register and/or data store for storing data and programming instructions, which when executed, performs image processing, feature extraction, identifies OOIs within multiple FOVs of the node CVS 205, classifies OOIs and forecasts and tracks motion of OOIs and the like. Collectively the fields of view of each intersection direction camera and the field of view of the wide FOV camera in both the horizontal and vertical fields define the node's VR.

The smart node 170 may collect information to understand traffic at intersections, even when no vehicles 105 are nearby, to improve routing or decision making, such as by the remote server system 155, the vehicle 105 or fleet controller.

FIG. 3 illustrates a horizontal field of view pattern 300 of the node CVS 205 of FIG. 2. For the sake of illustration, assume that at least one lane 310, represented in diagonal hatching is a first pair of intersection directions and at least one lane 313, represented in cross hatching is a second pair of intersection directions. The intersection of lane 310 and lane 313 has four roads at the point of intersection. Each of the four roads may include one-way or two-way traffic lanes.

The FOV pattern 300 of the node CVS 205 may include a first FOV defined by the angle between lines 322 and 322' and in the direction of the arrows of the lines 322 and 322'. The FOV pattern 300 of the node CVS 205 may include a second FOV defined by the angle between lines 324 and 324' and in the direction of the arrows of the lines 324 and 324'. The FOV pattern 300 of the node CVS 205 may include a third FOV defined by the angle between lines 326 and 326' and in the direction of the arrows of the lines 326 and 326'. The FOV pattern 300 of the node CVS 205 may include a fourth FOV defined by the angle between lines 328 and 328' and in the direction of the arrows of the lines 328 and 328'. In some scenarios, the angle of any one of the first, second, third and fourth FOVs may vary such that the any one FOV may be blocked by buildings, trees or structures along the at least one lane 310 and at least one lane 313. Likewise, the angle of any one of the first, second, third and fourth FOVs may vary such that the any one FOV may be enlarged by the absence of buildings, trees or structures along the at least one lane 310 and at least one lane 313.

In FIG. 3, assume for the sake of illustration the horizontal field of observation of the vehicle CVS 115 (FIG. 1) is defined by area 305 denoted in a dashed dot, dot box. The area 305 denotes the vehicle's VR. The vehicle CVS 115 (FIG. 1) may include cameras 315 which are configured to capture situational awareness of the environment to capture OOIs (i.e., moving objects, moving actors and moving vehicles). For example, the vehicle CVS 115 may capture images of the environment in up to 360° in a horizontal plane surrounding the vehicle 105, as will be described in more detail in relation to FIG. 5.

The definition of a camera's VR for camera 315 is defined as a FOV and angle of view associated with the camera's image capture sensor and lens configurations. The vehicles CVS 115 (FIG. 1) may include a plurality of spatially separated cameras 315, each camera with its own VR. The vehicle's VR is the collective FOVs and angles of view of the spatially separated cameras 315 on-board the vehicle 105. The representation of area 305 is for illustrative purposes and not meant to represent the actual area of the vehicle's VR. The node CVS 205 includes a plurality of spatially separated cameras 207 and camera 210, each camera with its own VR defined as a FOV and angle of view associated with the camera's image capture sensor and lens configurations. The node's VR is the collective FOVs and angles of view of the cameras 207 and 210 of the node 170.

Returning again to FIG. 2, assume that the intersection direction camera $207^1$ is pointed in the direction the arrows of lines 322, 322' to define a horizontal field of view FOV1; the intersection direction camera $207^2$ is pointed in the direction the arrows of lines 324, 324' to define a horizontal field of view FOV2; the intersection direction camera $207^3$ is pointed in the direction the arrows of lines 326, 326' to define a horizontal field of view FOV3; and the intersection direction camera $207^X$ is pointed in the direction the arrows of lines 328, 328' to define a horizontal field of view FOVX. Accordingly, the smart node 170 may provide perception argumentation data to vehicle 105 not observable by the vehicle CVS 115 of the vehicle 105 along at least one lane 310 or at least one lane 313. The horizontal field of view of the wide FOV camera 210 is represented as area 340 denoted in a dashed elliptical shape. The elliptical shape in not intended to be limiting in any way.

In many locations, each intersection does not include a light. Therefore, the first, second, third and fourth FOVs by the intersection direction cameras may extend through adjacent intersections along the at least one lane 310 and/or 313 until the next smart node along the at least one lane 310 or 313. For example, in the illustration, lane 309 intersects each of the lanes 312, 313 and 314. Lane 310 intersects each of the lanes 312, 313 and 314. Moreover, lane 311 intersects each of lanes 312, 313 and 314. The intersection between lane 310 and lane 313 also has a smart node 170.

FIG. 4 illustrates a vertical field of view pattern 400 of the node CVS 205 relative to the fourth FOV of FIG. 3. In the illustration, assume that the vertical FOV 427 of the intersection direction camera $207^X$ is pointed in the direction the arrows of lines 328, 328' (FIG. 3). As shown, the origin 429 (i.e., apex of origination) of the vertical FOV 427 is located at a point above the elevation of the ground. The elevation of the origin 429 may vary based on the mounting of the smart node 170. The wide FOV camera 210 of FIG. 2 may also contribute to the vertical FOV 427 the smart node 170. For example, the wide FOV camera 210 may overlap a portion of the vertical FOV 427 of the intersection direction camera $207^X$. The wide FOV camera 210 may be configured to capture an area hidden at the intersection from the vertical FOV 427 below line 430 as a result of the directionality of the lens of the intersection direction camera. The wide FOV camera 210 may be configured to capture the hidden area below the directionality of the lens of all intersection direction cameras of the smart node 170. Each narrow FOV camera has its own apex of origination.

The node (i.e., node 170) is configured to capture segmented perception data at an intersection. The node comprises a plurality of first cameras (i.e., cameras 207) that are each positioned to capture first digital images of an intersection from different FOVs within a first vision range. With reference to the first vision range of the node, the horizontal FOV would include the FOV including the unique segment fields of view denoted as FOV1, FOV2, FOV3 and FOVX. In some scenarios, the unique segment fields of view denoted as FOV1, FOV2, FOV3 and FOVX may have portions of the fields which overlap. Each first camera (i.e., camera 207) captures a different field of view having at a field of view apex (i.e., origin 429) and a depth of field to a different intersection direction, as shown in FIGS. 3 and 4. Each different field of view is a unique segment of the intersection. The node may include a second camera (i.e., camera 210) positioned to capture second digital images in a portion of the different field of view of each first camera and in a volume of space at the intersection vertically below the field of view apex of each first camera. The second camera captures the second digital images in a second vision range 440 of 360°. The second vision range 440 may be configured to capture images in a hemispherical pattern.

The node (i.e., node 170) may be configured to detect, in at least one the first digital images and the second digital images, a set of objects of interest surrounding the intersection. The node (i.e., node 170) may be configured to determine motion of each object of interest in the second set of objects of interest and generate APD for each object of interest of the second set of objects of interest. In the illustration of FIG. 4, the node may detect moving actor MA41 which may be out of view of all the first cameras (i.e., cameras 207).

The node (i.e., node 170) may comprise a communication system (i.e., modem 245 and communication unit 636) configured to communicate wireless communications within a communication range around the intersection including to transmit the APD to vehicles within the communication range of the communication system. The APD may include the determined motion and location data in a global coordinate system of each object of interest in the second set of objects of interest.

Figure 8:
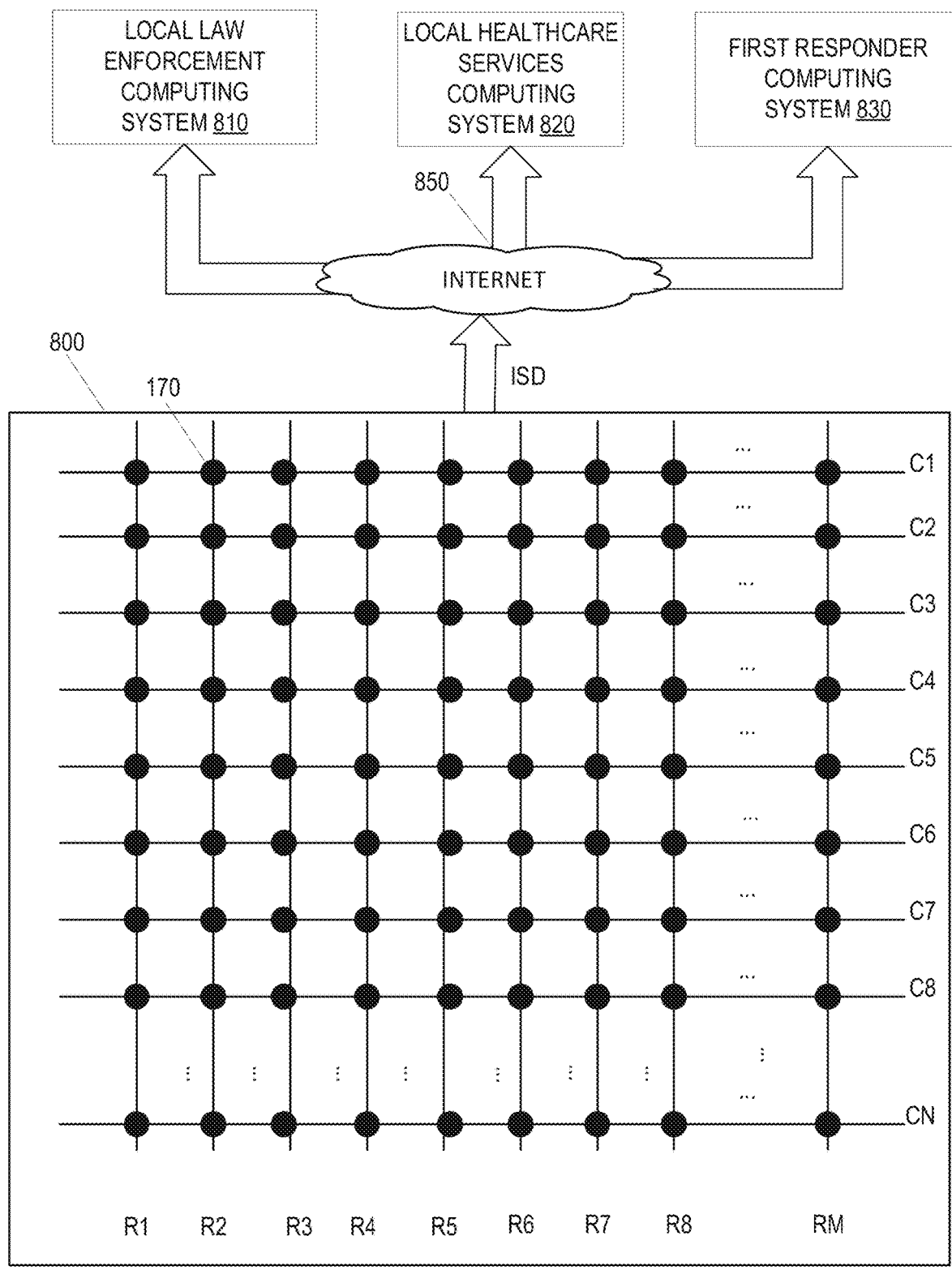
FIG. 8 illustrates a network of smart nodes.

The communication system may be further configured to communicate with one or more nodes of a network of nodes (FIG. 8).

In the illustration, a moving actor MA41 is capable of being imaged by the wide FOV camera 210 but not the intersection direction camera $207^X$ or any other intersection direction camera until the moving actor MA41 comes into view of the lens of the intersection direction camera $207^X$. Accordingly, there is a volume of space directly below and surrounding the smart node 170 which may not be able to capture images of moving objects or OOIs by the intersection direction camera $207^1$, $207^2$, $207^3$, ..., $207^X$. Thus, any moving object may appear in a field of view of one of the intersection direction cameras and disappear. However, the wide FOV camera 210 is configured to capture images within the hidden volume of space and at least an overlapping portion of the narrow FOV of each intersection direction camera of the intersection direction cameras 207 to that motion tracking and forecasting of one or more OOIs is not interrupted when hidden from the intersection direction cameras 207.

Regarding FIGS. 3 and 4, the second vision range 440 may extend to approximately 25 meters (m) radially from a center of the intersection, such as for a node mounted approximately 20 feet (ft.) above ground. The cameras 207 may each have a horizontal FOV of approximately 42°. The cameras 207 may each have a vertical FOV of approximately 26.25°. However, cameras 207 may have a horizontal FOV which is in the range of 20-50°, for example. By way of non-limiting example, for intersections require more than four cameras 207, the horizontal FOV may be reduced. For intersection with less than four cameras, the horizontal FOV may be increased. The cameras 207 may each have a depth of field which is 20-159 meters (m) from the center of the intersection, for example, along each direction covered by the cameras 207.

Referring again to FIG. 2, the node controller 225 may include a processor 230 and a communication device 245. The node controller 225 may include a GPU 235 configured to process the images or video streams from the intersection direction cameras 207 and the wide FOV camera 210 of the node CVS 205. The node controller 225 may include a local storage device 240 configured to store the captured images of the multiple FOVs and store programming instructions for carrying out the functions of the smart node 170 described herein, including image processing, feature or object extraction, location determination, speed of a moving object or vehicle, and direction of movement of a moving object or vehicle, for example.

The communication device 245 may include a LTE modem or other communication device configured to communicate using a wireless communication protocol, which may be part of a communication system. The communication device 245 may communicate the APD 175 to the vehicle 105. The APD 175 may include one or more packets with one or more APD fields. For example, each APD field may include information associated with a different one OOI in the environment in-range of the smart node 170. An OOI may include stationary objects, moving objects, moving actors, moving vehicles. The "in-range" may be based on the distance or range the intersection direction cameras can capture images. For example, if the intersection direction camera can capture images at a distance of up to 20 meters from the camera, the vehicle may be in-range when the vehicle is 20 meters from the intersection or node location. The node controller 225 may include an edge machine learning (ML) accelerator interfaced with the cloud computing system or remote server system 155 via the Internet 150. The smart node 170 may include a GPS 230 or have fixed location coordinates stored in memory of the local storage device 240.

Figure 5:
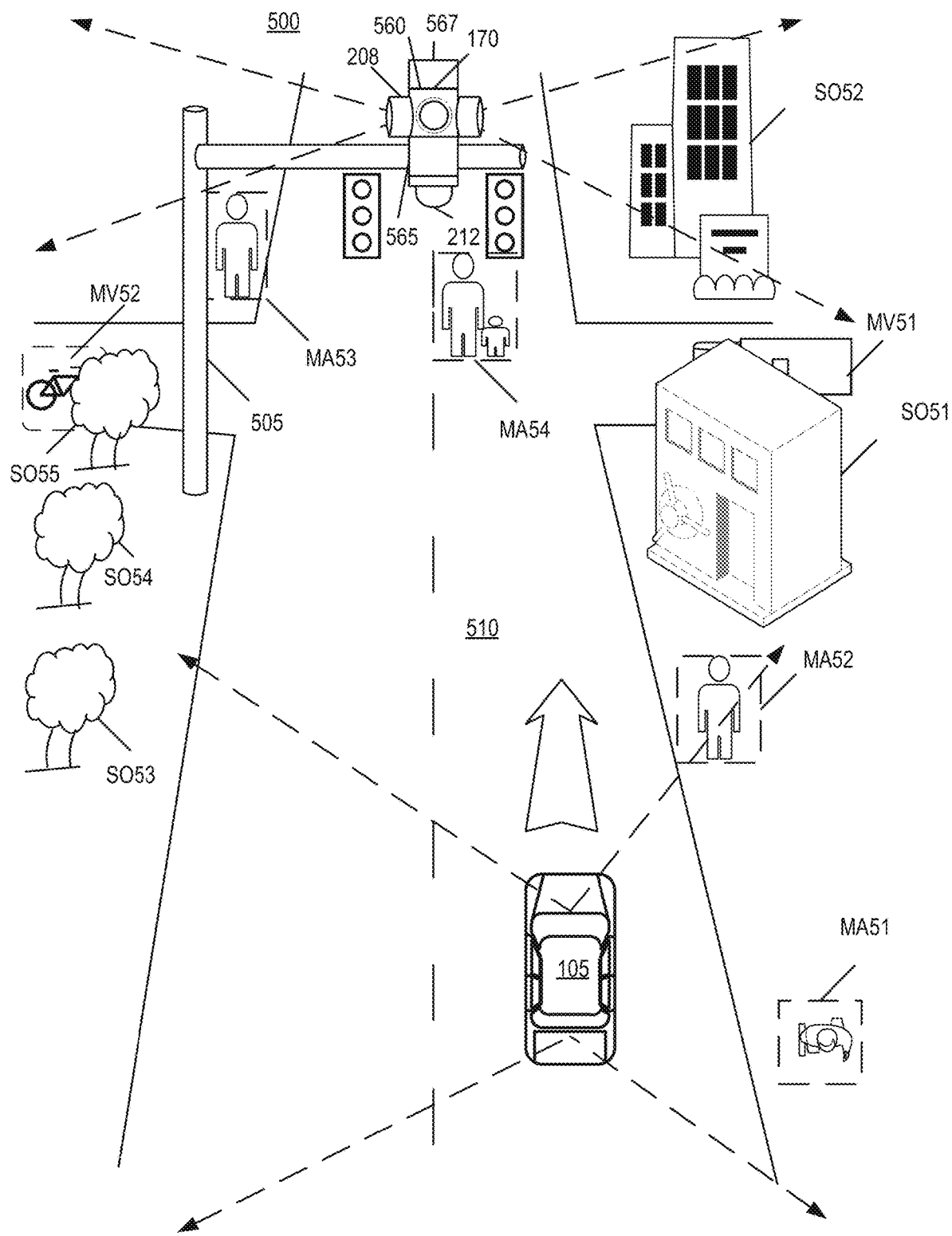
FIG. 5 illustrates the system of FIG. 1 with a smart node installed on a traffic light gantry and an environment with moving actors, moving vehicles and stationary objects.

FIG. 5 illustrates the system of FIG. 1 with a smart node 170 installed on a gantry of a traffic light pole 505. The smart node 170 may include at least one node housing 560 to house the plurality of first cameras (i.e., cameras 207), the second camera (i.e., camera 210), the processor 230, the computer-readable storage medium 240 and the communication system (i.e., LTE modem 245 and/or communication unit 636). The smart node 170 may include at least one node mount assembly 565 to attach the at least one node housing 560 to a gantry of a traffic light pole. The at least one node mount assembly 565 may include clamps, fasteners, brackets, and/or straps. The at least one node housing 560 may include a camera housing for housing and mounting the cameras 207 and camera 210. The smart node 170 may include a separate housing 567, such as a node controller housing, for housing the processor 230, the computer-readable storage medium 240 and the communication system. Nonetheless, the at least one node housing 560 may integrate one or more housings into a single housing assembly for mounting to the gantry of a traffic light pole. The depicted arrangement of the housings 560 and 567 is for illustrative purposes and not meant to be limiting in any way.

In this illustration, the environment 500 includes moving actors MA51, MA52, MA53 and MA54. The environment includes stationary objects SO51, SO52, SO53, SO54 and SO55. The stationary objects SO51 and SO52 include buildings, for example. Stationary objects SO53, SO54 and SO55 may be trees. In this illustration, the stationary objects SO51, SO52, SO53, SO54 and SO55 are on either the right or the left side of road 510 of the path driven by the vehicle 105.

In the illustration, the intersection environment includes moving objects MV51 and MV52. As an example, the moving object MV51 is obscured by stationary object SO51. Therefore, the vehicle CVS 115 of the vehicle 105 is not capable of imaging the obscured stationary object SO51. However, the obscured stationary object SO51 relative to the vehicle CVS of the vehicle 105 is within the field of view of at least one intersection direction camera 207 and/or the field of view of the wide FOV camera 210 of the node CVS 205 of the node 170.

The moving actors MA51, MA52, MA53 and MA54, the stationary objects SO51, SO52, SO53, SO54 and SO55, and the moving objects MV51 and MV52 are examples of OOIs in the environment and in-range of the node 170.

In operation, the smart node 170 may determine and track at least one of the location, direction and speed of the moving vehicle MA51 hidden behind a building (i.e., stationary object SO51) relative to vehicle 105. In operation, the smart node 170 may determine and track at least one of the location, direction and speed of a moving bicycle (i.e., moving vehicle MA52) hidden by trees (i.e., stationary objects SO53, SO54 and SO55). The vehicle 105 may automatically update its on-board computing device 1010 (FIG. 10) with the APD 175 to control the AVDS 265 as the vehicle 105 becomes in-range of the node 170, passes through the intersection and moves out of range of the node 170.

In this illustration, moving actors MA51, MA52, MA53 and MA54 are within the view of the vehicle CVS 115 of the vehicle 105 and the node CVS 205. However, if moving actors MA54 is below the node CVS 205 of the node 170, the moving actors MA54 may be out of view from all the intersection direction cameras but in the field of view of the wide FOV camera. However, if the moving actors MA54 moves behind the stationary object SO51, the moving actors MA54 may be out of view of the vehicle CVS 115 of the approaching vehicle 105 but in view of one or more intersection direction cameras of the node 170. In the illustration, moving actors MA54 include an adult and child together. Therefore, the motion and speed estimation may be based on the speed of a child and not the adult.

The APD 175 may be communicated to the remote server system 155 and received in advance of the arrival of a vehicle 105 at the intersection, in response to a query for current APD information associated with the intersection. The current APD information provides the on-board computing device 1010 (FIG. 10) of the vehicle 105 advance notice or situational awareness as the vehicle approaches the intersection where the current APD information of a node is fused with information captured by the vehicle CVS. As will be described in relation to FIG. 6B, in some scenarios, a tracker fusion management server 655 of the remote server system 155 may communicate the APD 175 in response to a query from a vehicle 105. In other scenarios, the smart node 170 may broadcast the APDs 175 for receipt by those vehicles in-range of the node 175. The on-board computing device 1010 (FIG. 10) of the vehicle 105 may determine that the APD 175 includes information representative of advance notice of obscured or hidden moving objects in the surrounding environment which are along or in proximity to the imminent path to be driven by the vehicle 105. The APD 175 is generated using off-board processing relative to the vehicle but on-board processing by the smart node 170.

In the environment, a moving actor may be tracked to a stationary vehicle (i.e., parked car) in the environment. Assume that moving vehicle MV51 is stationary. However, as the once moving actor opens a vehicle door, such moving vehicle door becomes a moving object which can be reported to an approaching vehicle in-range of the smart node 170, especially if the moving vehicle door is opening up into the imminent path to be driven by the vehicle. The APD 175 may be representative of information associated with the moving object (i.e., moving car door). The APD 175 relative to the moving car door may be important to the on-board computing device of the vehicle depending on the location of the moving object relative to at least one of the speed and location of the approaching vehicle. Some vehicle doors may open into the imminent path of an approaching vehicle. Then, once the vehicle door closes, the stationary vehicle may be denoted as a pending moving vehicle. The node CVS 205 may use image tracking and machine learning to predict, in some embodiments, when a parked vehicle may become a moving vehicle based on timing a moving actor moved into a driver's seat of the parked vehicle. In such a scenario, lights of the parked vehicle may turn on or flash as the vehicle turns on which may be captured by the node CVS 205. Once the vehicle becomes a moving vehicle, the APD 175 subsequently reported or updated may be representative of information associated with the moving vehicle, including location, direction and speed. The APD 175 for each OOI and especially those OOI hidden from any one of the vehicles in range of the node 170 can be used by the AVDS 265 to refine its navigational guidance based on off-board advanced notification of obscured OOI, such as an obscured OOI with a forecasted motion toward or in the imminent path of the vehicle 105, by way of non-limiting example. While, a vehicle is in-range of the smart node 170, the APD 175 of an OOI may be representative of (i) at least one of an obscured OOI relative to vehicle CVS 115 of the vehicle, (ii) out-of-FOV range OOI of the vehicle CVS 115 of the vehicle relative to the imminent path to be driven by the vehicle and/or (iii) vehicle identified OOIs discovered, classified, and tracked by the AVDS. An obscured OOI may be obscure from the vehicle CVS 115 and is defined as an OOI which is hidden from view by objects or structures within the environment, for example. An OOI that is out-of-FOV range of the vehicle CVS 115 represents an OOI that is capable of being imaged using the cameras of the node CVS of the intersection but out of the FOV range of the cameras of the vehicle CVS 115.

Thus, the system 100 uses advanced processing capabilities at the smart node 170 instead of relying on off-board capabilities. The smart node 170 may only require a single sensing modality (i.e. cameras) to provide perception augmentation directly or indirectly to in-range vehicles 105. The perception augmentation is provided indirectly to the in-range vehicles 105 via the remote server system 155.

Figure 6A:
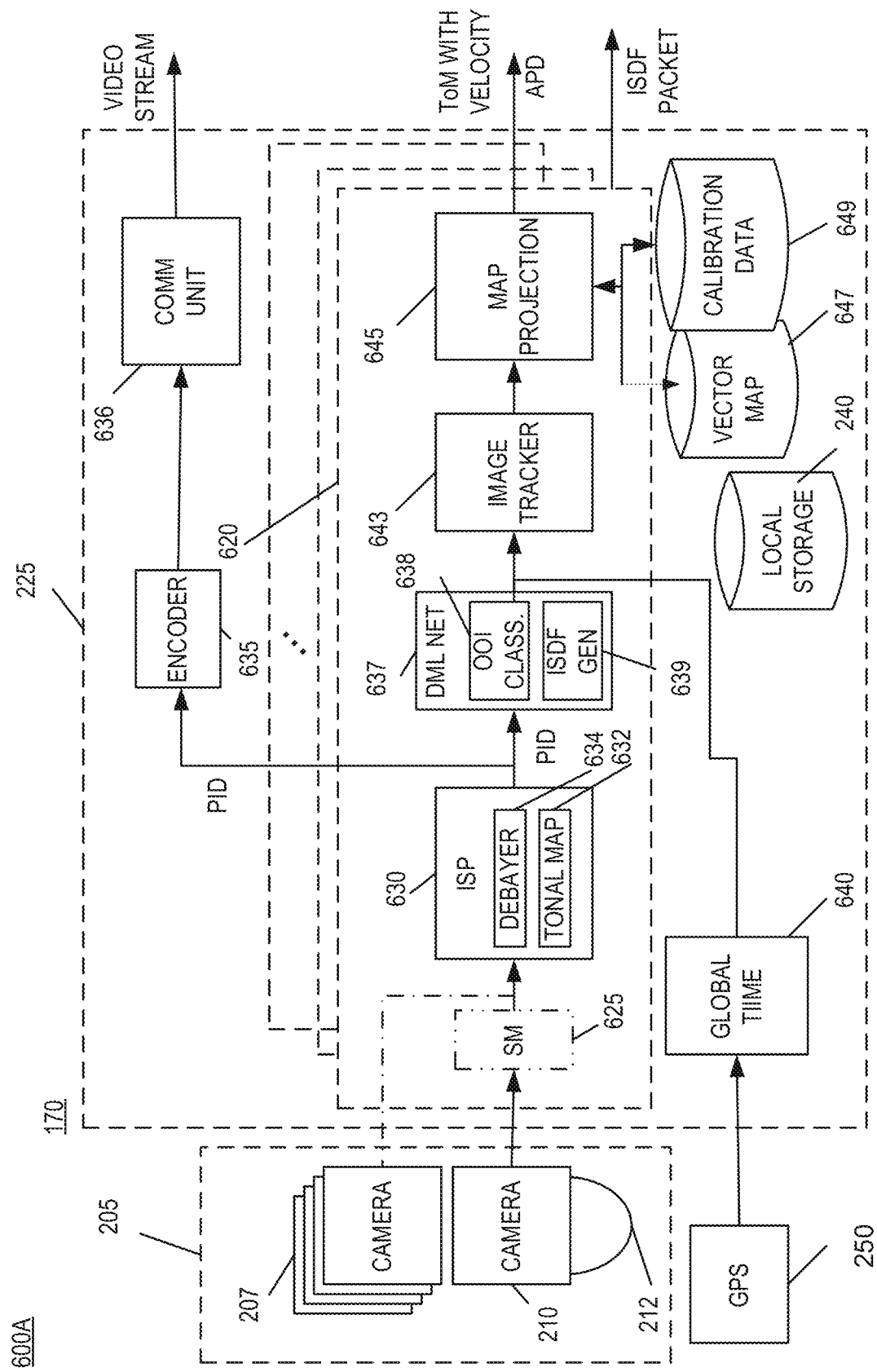
FIGS. 6A-6B illustrate a block diagram of the system and communications between a remote server system, autonomous vehicle and smart node.
Figure 6B:
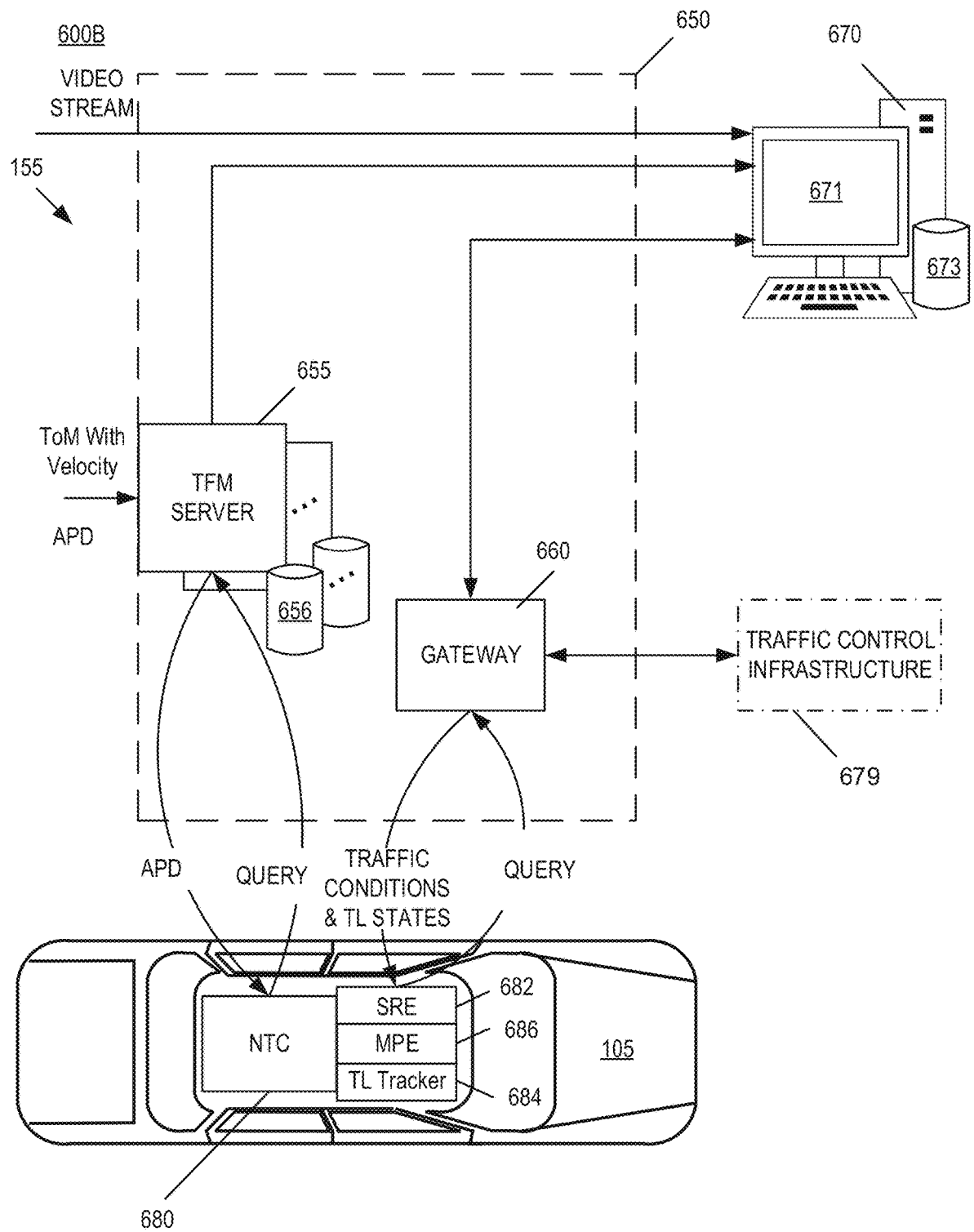

FIGS. 6A-6B illustrate a block diagram of the system and communications between a remote server system 155, vehicle 105 and smart node 170. The system includes two system parts illustrated across two figures FIGS. 6A and 6B. Therefore, the system of FIGS. 6A-6B includes at least one smart node 170 in system part 600A of FIG. 6A and the remote server system 155 and vehicle 105 shown in system part 600B of FIG. 6B.

The node 170 may include a node CVS 205 comprising narrow FOV cameras 207 and a wide FOV camera 210 which produce raw images. The raw images may be sent to the node controller 225 which may include a processor 230 (FIG. 2) configured to process received raw images from the node CVS 205 in one or processing channels 620. Since each processing channel 620 is essentially the same, only one such channel 620 will be described in more detail.

The one or more processing channels 620 may process the raw images from the node CVS 205 using signal processing algorithms 630 executed by the processor (sometimes referenced in the figures as "ISP 630"). The signal processing algorithms 630 may include, without limitation, debayer filtering algorithms 634 such that raw images become red, green, blue (RGB) images. In one or more embodiments, the signal processing algorithms 630 may also employ tonal mapping algorithms 632 to approximate an appearance of images such as for generating processed image data representative of high dynamic range images. The node controller 225 may process the raw images from each of the cameras 207 and 210 in parallel by the processing channels 620 such that each channel processes a different raw image stream of a respective different camera. One of the processing channels 620 may include a segmentation module (SM) 625, denoted in a dash, dot, dot box, configured to segment the omni-directional image (i.e., image 710) captured by the wide FOV camera 210. The dash, dot, dot box of the segmentation module 625 denotes that it may not be used in other channels. The dash, dot, dash line from cameras 207 denotes that the camera output in some channels may be fed into the signal processing algorithms 630 of those channels.

The smart node 170 may include an encoder 635. For example, the encoder 635 may be an H-265 encoder configured to encode data using an H.265 encoder protocol. The image data output by execution of the signal processing algorithms 630 may be sent to the encoder 635. The encoder 635 may be implemented using hardware, firmware, software or a combination of any of these. For instance, encoder 635 may be implemented as part of a microcontroller and/or processor with a register and/or data store for storing data and programming instructions, which when executed, performs the encoding of the image data using an encoding protocol.

The image data output from the encoder 635 may be in the format representative of a video stream or still images. The output of the encoder 635 may be sent, via a communication unit 636, to a traffic control server 670 of the remote server system 155, for example, and archived in memory 673. The communication unit 636 may include a modem, transmitter, receiver and/or network card to communicate with the remote server system 155 using a wireless or wired communication protocol via the Internet, for example.

The processing channel(s) 620 may process the image data using a deep machine learning (DML) network 637. The deep machine learning network 637 may be implemented using hardware, firmware, software or a combination of any of these. For instance, the deep machine learning network 637 may be implemented as part of a microcontroller and/or processor with a register and/or data store for storing data and programming instructions, which when executed, performs the deep machine learning or performs machine learning algorithms for identifying and classifying OOIs. The deep machine learning network 637 may be configured to perform feature extraction associated with situational awareness of currently moving objects, moving vehicles, moving actors, as well as, stationary objects, stationary vehicles and stationary objects which have a propensity for motion. The deep machine learning network 637 may include an OOI classifier 638. The feature extraction may find, identify, and locate OOIs in each captured image using one or more feature extraction algorithms. The term "locate" as used herein may relate to geographical coordinates to locate the OOI in a global coordinate system.

Feature extraction algorithms may include, without limitation, edge detection, corner detection, template matching, dynamic texture processing, segmentation image processing, motion detection, frame difference methods, object tracking, background subtraction, object recognition and classification, etc. By way of non-limiting example, the background subtraction algorithm may include an adaptive Gaussian mixture model. Motion tracking algorithms may determine a multiple object tracking precision (MOTP) metric and a multiple object tracking accuracy (MOTA) metric to improve performance of the motion tracking by the node or vehicle. The object tracking and motion tracking may use correlation filters and affinity matrix methodologies, by way of non-limiting examples.

By way of non-limiting example, when an OOI is located in an image, the location data may be in GIS spatial raster format which may subsequently be translated to a GIS spatial vector format. When detecting motion of an OOI, captured images with the OOI separated in time may be analyzed for motion. The captured images may be of the same intersection direction or region of interest within a field of view of a camera. In the embodiments, the node cameras are generally stationary. An object may be identified in a first image, such as in a frame of the first image. The object may be tracked in the next subsequent or consecutive image separated in time from the first image. For example, pixel-based frame differencing, background subtraction, etc. may be used to detect motion of an OOI in an intersection direction toward or away from the intersection. Each OOI of a set of OOIs may be represented as a motion vector corresponding to the motion direction and a velocity or speed magnitude.

The OOI may be represented in GIS spatial raster data. The OOI GIS spatial raster data may be translated to GIS spatial vector data with longitude and latitude coordinates for example. The process for translating or converting GIS spatial raster data to and from GIS spatial vector map data is known in the art. The difference between the OOI GIS spatial raster data or OOI GIS spatial vector map data of the separated in time images may provide a distance traveled value, such as in miles. The distance traveled value may be a function of a reference point of the node at an intersection or some other reference point associated with the intersection. Furthermore, the interval of time (e.g., fraction of hour, minutes or seconds) between the time of the capture of the first image and the time of the capture of the next subsequent image may be used to determine the speed or velocity of the OOI under evaluation to determine the miles per hour (MPH) or some other metric denoted speed or velocity.

The OOI location includes global coordinates of a global coordinate system. The vehicle may determine a first set of OOIs based on the vehicle's VR. The node may determine a second set of OOI based on the node's VR. By way of non-limiting example, at least one OOI in the second set of OOIs may include global location coordinates which are outside of the vehicle's VR immediately before or at the time the APD is received by the vehicle from the remote server system 155. In some scenarios, the APD is received by the vehicle from an in-range node. The controlling of the motion of the vehicle may include using the APD of the at least one OOI in the second set of OOIs having the location coordinates outside of the vehicle's VR.

The deep machine learning network 637 may include an intersection situational data flag generator (ISDF GEN) 639. The flag generator 639 may determine which OOI classification from the OOI classifier 638 should be flagged as intersection situational data so that such information may be sent to other remote computing systems via an intersection situational data flag packet, as will be discussed in relation to FIGS. 8 and 9B.

The processing channel(s) 620 may include an image tracker 643 which receives the information associated with an extracted one OOI and to create the APD 175 which is time stamped with a global time reference via the global time module 640. Thus, the image tracker may be configured to determine a speed for each moving OOI. The GPS 250 may provide GPS signals to a global time module 640 where the local time is synchronized with the GPS timing data. The image tracker 643 may track OOIs associated with the FOV within the multiple FOVs for the generation of the respective APD for each corresponding OOI processed.

Each processing channel 620 may include a map projection module 645. The smart node 170 may use high definition maps. The node 170 may store vector map data in database 647 and calibration data in database 649 where the databases include a memory storage device. The vector map data may include vector-based geographic information system (GIS) data about the earth. The vector map data may include coordinate reference system of global coordinates associated with a longitude and latitude of the earth. The vector map data may include major road networks, geographic boundaries, elevation data, etc. The vector map data may be updated dynamically. The map projection module 645 may include a periodic map registration process as changes to the environment occur. The map projection module 645 may convert or translate location data of an OOI from two-dimensional (2D) image space (raster image coordinates) to a three-dimensional (3D) world or map space of a global coordinate system. The map projection module 645 may receive GIS spatial data in a raster image format associated with the image. The image data of an OOI is mapped (i.e., converted or translated) from a 2D image location (i.e., pixel coordinates x, y) (GIS raster spatial data) to a 3D location with latitude, longitude and altitude coordinates (GIS vector spatial data) of a global coordinate system. The smart node 170 may further include local storage 240 as previously described in relation to FIG. 2.

In at least one scenario, the smart node 170 may include detection and tracking software based on machine learning algorithms to provide an understanding (situational awareness) of the environment around and beyond an intersection using a single sensing modality via the node CVS 205 by tracking at least moving actors and moving objects in the environment and by determining their location, direction of motion and speed of travel.

Referring now to FIG. 6B, the system part 600B may represent the remote server system 155 of FIG. 1. The system part 600B may include at least one remote processing system 650. The system part 600B may include at least one traffic control server 670. The remote processing system 650 may include at least one tracker fusion management (TFM) server 655 and memory 656. Received information by the TFM server 655 and other programming instructions may be stored in memory 656. The tracker fusion management server 655 may communicate with the networked track client (NTC) 680 which may be part of processor 125. The processor 125 of the vehicle 105 may also include a smart routing engine (SRE) 682 and a traffic light tracker 684. In some embodiments, a single tracker fusion management server 655 may serve a set of smart nodes. The set of smart nodes may include smart nodes which are placed in a particular geographic area. To prevent crowding in the drawings only part of the navigation control will be described in FIG. 6B. The autonomous vehicle navigation controller (AVNC) 1020 will be described in more detail in relation to FIG. 11.

The tracker fusion management server 655 may provide augmented local tracks information (i.e., APD information) to the vehicle 105, in response to receiving a query from the vehicle 105. The tracker fusion management server 655 acts as a broker between those smart nodes 170 associated with the fusion management server 655 and those vehicles 105 traveling to and along an imminent path including the smart nodes at certain intersections. In some embodiments, instead of having each smart node 170 communicate the APD to the in-range vehicles 105 at any instantiation, the smart node 170 may communicate the APD to the tracker fusion management server 655 in order to reduce the amount of the communications and communication data costs at the node. The tracker fusion management server 655 may then communicate the received APD information to vehicles 105 that are in communication with the tracker fusion management server 655. The received APD may be sent to the vehicle, in response to a specific query initiated by the vehicle for the real-time APD of a particular traffic light the vehicle is approaching.

With reference to FIG. 3, augmented local tracks information to a vehicle from the tracker fusion management server 655 may include APD information from more than one smart node. By way of non-limiting example, in a scenario, an intersection, hereinafter referred to as an "intermediate intersection" may not include a smart node. However, a vehicle may query the tracker fusion management server 655 for augmented local tracks information that may include APD information derived by one or more nearby smart nodes where a nearby smart node may capture OOIs in proximity to the intermediate intersection. Furthermore, augmented local tracks information may include predicted information at an intersection having a smart node, where the predicted information may affect motion of the vehicle through an intermediate intersection. In some scenarios, the augmented local tracks information to a vehicle from the tracker fusion management server 655 may include APD information from two adjacent smart nodes as a vehicle may be traveling to and along an imminent path which may have a portion covered by overlapping VRs of adjacent smart nodes. Accordingly, in some scenarios, augmented local tracks information communicated by the tracker fusion management server 655 may include APD information from at least one smart node at any instantiation. The term "augmented local tracks information" and "APD information" may be used interchangeably herein. Nodes in the network of nodes may provide a second set of OOIs, a third set of OOIs and so on and so forth. These sets of OOIs from the nodes or portions thereof may be fused with the vehicles first set of OOIs.

The networked track client 680 connects to and queries the tracker fusion management server 655. The network track client 680 receives augmented local tracks information, in response to the vehicle's query, from the tracker fusion management server 655. The received node's APD may be combined with the vehicle's own perception data by the network track client 680 and feed into the motion planning engine 686 and smart routing engine 682 of the autonomous vehicle navigation controller 1020 (FIGS. 10 and 11). The vehicle's information and a node's APD information may be used by the vehicle 105 to improve routing, by way of non-limiting example, by knowing the traffic pattern along an avenue that has its traffic lights sequentially changed to maintain traffic flow. Vehicle's information may include routing information and other computer vision information about an OOI detected by the vehicle 105, as described in relation to FIG. 11. The augmented local tracks information from the tracker fusion management server 655 is sent to the vehicle 105, and the vehicle 105 handles combining the vehicle's information and APD information itself.

The tracker fusion management server 655 may receive tracks on a map (ToM) with velocity from at least one smart node 170. The tracks on the map information includes the APD information converted into the 3D global coordinates. The tracker fusion management server 655 may fuse the augmented perception data from adjacent nodes of the network of nodes in response to a search, each adjacent node may have a respective different node vision range associated with coordinates of the imminent path.

The smart routing engine 682 may be configured to receive data representative of traffic conditions (TC) and TL states related to routing for dynamic adjustment to a planned route using real time information from the smart node network 800 (FIG. 8). The received data representative of the traffic conditions and TL states may be in response to position and route data provided from the vehicle to the gateway 660. The received position and route data from the vehicle 105 may also be sent to a traffic control server 670. The position and route data received by the gateway 660 may also be used by traffic control server 670 to subsequently control a single vehicle or a fleet of vehicles. The gateway 660 may interface with external traffic control infrastructure 679, denoted in a dash, dot box to represent that the traffic control infrastructure 679 is not part of the remote server system 155.

The gateway 660 may be a broker agent or server to aggregate received information about traffic light signal devices such as without limitation, dynamic timing control and/or traffic light signal control schedules. For example, traffic light signal devices may have a different timing sequence during rush hour time intervals than at other times. Information from the traffic control infrastructure 679 may come from different sources. Traffic light signal timing may be used by the machine learning modules for the traffic light classification process or the classification training process. The traffic light timing sequence may change from one city, town or state to another. Thus, the gateway 660 may sometimes be referred to as "gateway server 660."

The tracker fusion management server 655 may communicate with the traffic control server 670 configured to receive the video stream or digital images from the nodes 170 in the network 800 (FIG. 8) which may be processed and/or archived in memory 673. The traffic control server 670 may include a local or remote monitor 671 which allows a user to connect to and inspect current data flowing in and out of the tracker fusion management server 655. A user may visualize the traffic flow and APD information of any smart node 170.

In some scenarios, the vehicle may receive traffic conditions and TL states from the gateway server 660. The traffic condition information may be provided from the traffic control server 670 based on assembled data from the smart nodes 170 directly and indirectly via the tracker management server 655. The vehicle 105 may provide current vehicle position information and route information to the gateway server 660 so that the TL states are for those traffic lights that are along the imminent path of the remaining portion of the planned route yet to be traveled.

The transceiver 120 of the vehicle 105 is configured to receive, from a remote server (i.e., traffic control server 670) network traffic information representative of traffic condition detected within the VR of any node of the nodes. The on-board computing device 1010, via the navigation controller 1020 (FIGS. 11-12), may determine a traffic congestion condition (TCC) at least one node located along the imminent path, based on the received network traffic information. The on-board computing device 1010, via a navigation controller 1020, may modify the imminent path or planned route of the vehicle, in response to the determined traffic congestion condition. The on-board computing device 1010, via the navigation controller 1020, may control the motion of the vehicle using the modified imminent path.

Figure 7:
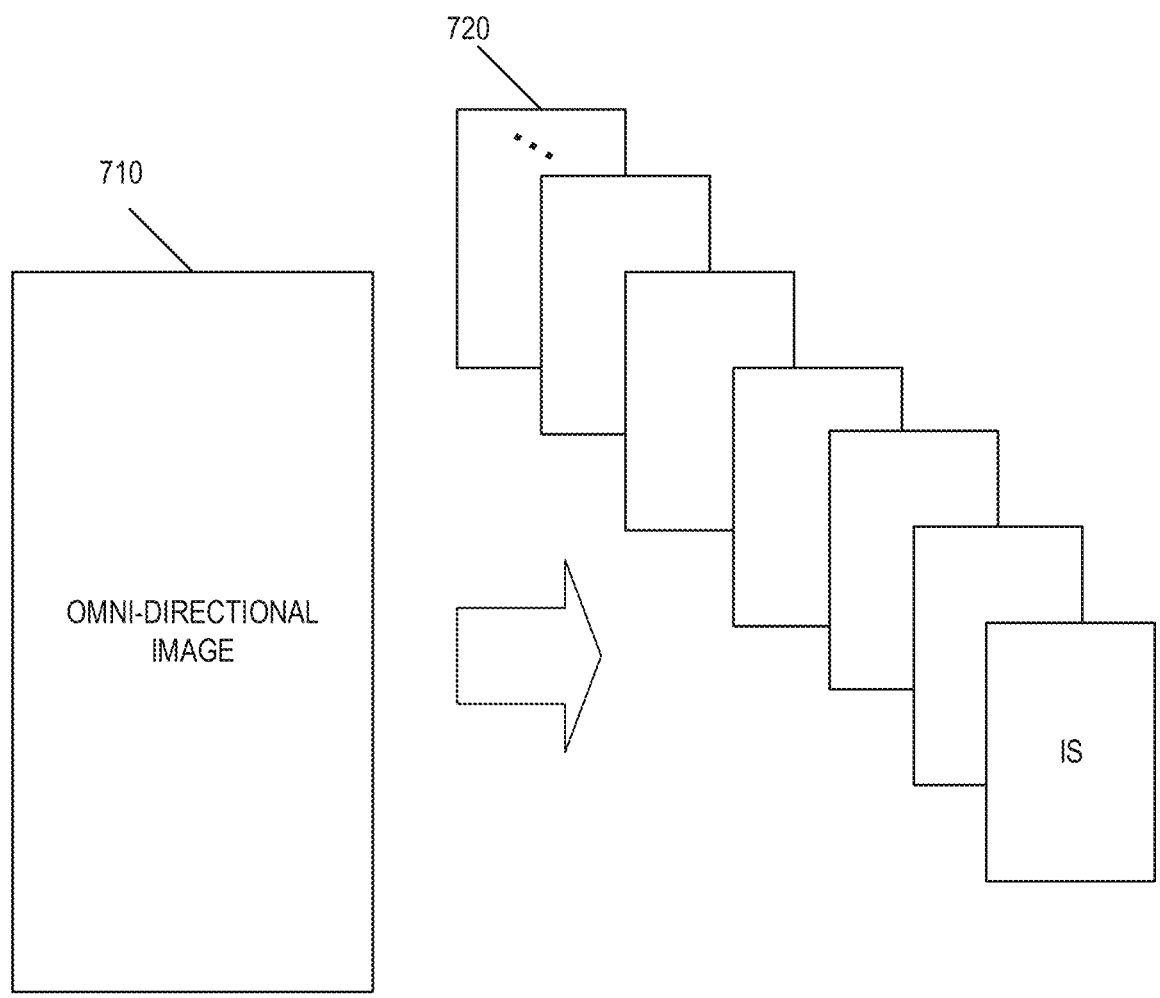
FIG. 7 illustrates an omni-directional image being segmented.

FIG. 7 illustrates an omni-directional image 710 being segmented. The omni-directional image 710 may be captured by the wide FOV camera 210. The omni-directional image 710 may include raw image data. However, the node controller 225 may need to segment the omni-directional image 710 into multiple image segments (IS) 720 by the segmentation module 625 (FIG. 6A). The ISP 630 may receive segments of the wide FOV image (i.e., omnidirectional image 710) from the segmentation module 625 and then process each image segment 720, by way of non-limiting example.

FIG. 8 illustrates a network 800 of smart nodes 170. Each smart node 170 is represented as a black circle in a grid or mesh where each smart node 170 is at an intersection. The intersection may include traffic lights. However, one or more intersections being sensed by the smart node 170 may not include any traffic lights. There may be road intersections between any two adjacent smart nodes along a row or column of the grid or mesh shown which are not sensed by a smart node. For the sake of illustration, the network 800 includes smart nodes 170 in columns C1-CN and rows R1-RM where M and N are a non-zero integers greater than 1. The smart nodes 170 may communicate to the remote processing system 650 and/or the at least one tracker fusion management server 655 (FIG. 6B). Intersections equipped with smart nodes 170 can be interconnected to provide not only local augmented perception data (APD) 175, but also city-wide information pertinent to routing and planning of the vehicle 105. By way of non-limiting example, the planned route to be traveled by the vehicle 105 may be preplanned based on one or more types of information, including the destination location of the vehicle 105 relative to the origination location of the vehicle 105. The planned route may be based on tolls or other information. However, while the vehicle is navigated to and along an imminent path representative of a planned route to the destination location, the navigation controller 1020 may determine traffic backup due to traffic congestion or traffic accident based on the received APD information.

The smart node's APD information to the remote processing system 650 may be fused by the tracker fusion management server 655 where the tracker fusion management server 655 and/or traffic control server 670 may then detect such traffic congestion or traffic accident. For example, a smart node 170 providing information about three or four OOIs of the moving vehicle type in the narrow FOV of the intersection direction cameras may be representative of low traffic congestion conditions at the intersection of the reporting smart node 170. However, information about 30-40 OOIs of the moving vehicle type may be representative of high traffic congestion conditions at the intersection of the reporting smart node 170. As the number of OOIs of the moving vehicle type increases at adjacent smart nodes, the tracker fusion management server 655 may fuse such data to forecast traffic conditions which can be downloaded to the on-board computing device 1010 (FIG. 10) of the vehicle 105 and processed for adjusting its planned route. In some scenarios, the traffic control server 670 may fuse such data to forecast traffic conditions from one or more tracker fusion management servers 655 or nodes. The smart nodes may generate intersection situational data which may be flagged by the flag generator 639 (FIG. 6A) to flag certain APD information for communication to additional remote computing systems, as shown in FIG. 8.

In a scenario, adjacent nodes 170 may communicate with each other to track a vehicle of interest which may be involved in an accident but left the scene. In other words, each respective node 170 may be configured to further classify a moving vehicle as a flagged object of interest. The APD information of a flagged object of interest may be flagged as intersection situational data for additional tracking by adjacent nodes 170. Furthermore, image information associated with the flagged object of interest may be flagged as intersection situational data for law enforcement purposes and sent to a local law enforcement computing system 810 to report an accident. The OOI classifier 638 may generate the flag based on the type of intersection situational data identified.

In a scenario, as the each node 170 detects and tracks OOIs, an OOI may be further classified as in need of medical attention, the node 170 may flag the image information and/or APD information of the respective OOI as intersection situational data for communication to a local healthcare service computing system 820, local law enforcement computing system 810 and/or first responder computing system 830. For example, in the event of a robbery, the node 170 may flag the image information and the APD information for all OOIs involved for reporting to the local healthcare service computing system and the local law enforcement computing system, for example. The term all OOIs, in this instance, may include witnesses, victim and assailant, by way of non-limiting example. A first responder computing system 830, such as that of a local fire department or other first responder agency, may be in communication with each node 170.

In a scenario, an OOI may include a weapon where the node 170 may be configured to further classify the weapon type of the OOI which in some cases may be flagged as intersection situational data. In a scenario, multiple OOIs may be grouped into a single OOI, such that the single OOI of a group is tracked collectively. This has applications for a group of bicyclist passing through an intersection or a group of runners. Specifically, the motion of the single OOI based on a group of OOIs may be predicted or forecasted based on a classified group type.

The local law enforcement computing system 810, the local healthcare services computing system 820 and/or first responder computing system 830 may be web-based systems configured to receive internet communications via the Internet 805 or World Wide Web (WWW) from the network 800 or each node 170, for example. The local healthcare services computing system 820 may include an ambulance service. The local law enforcement computing system 810 may include communications to the local police, local sheriff, and/or state troopers. The local law enforcement computing system 810, the local healthcare services computing system 820 and/or first responder computing system 830 may receive flagged information as generated by the intersection situational data flag generator 639 (FIG. 6A) from a corresponding smart node 170.

Figure 9A:
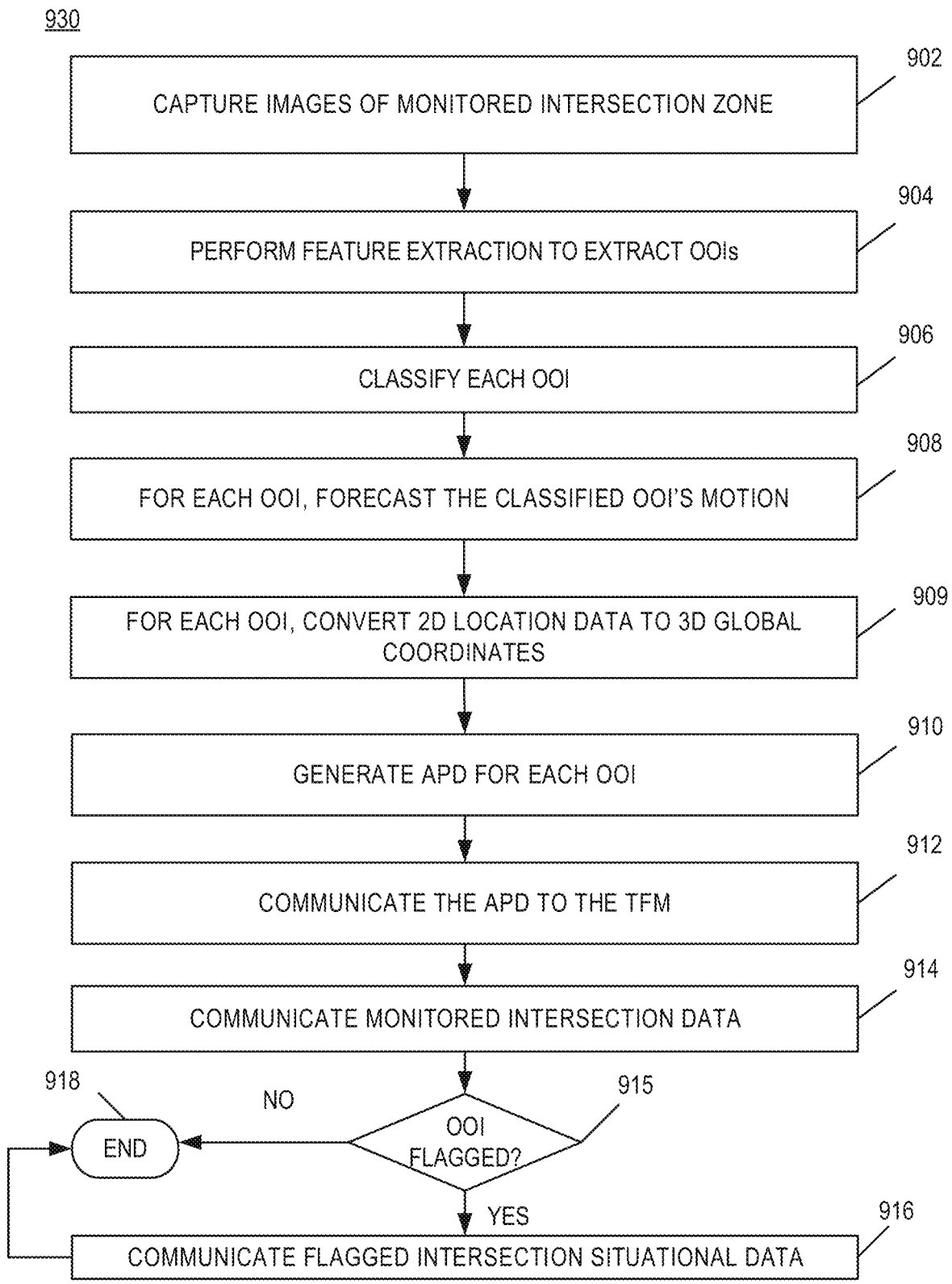
FIG. 9A illustrates a flowchart of a method of sensing an environment by a smart node.

FIG. 9A illustrates a method 900 of sensing an environment by a smart node. The methods described herein may be performed in the order shown, a different order or one or more blocks may be performed contemporaneously. One or more blocks of the method may be omitted and one or more blocks may added.

The method 900 may include, at block 902, capturing images of a monitored intersection by a smart node 170. The monitoring includes capturing images from multiple FOVs. The images may be captured by the cameras of the node CVS 205 (FIG. 2). The method 900 may include, at block 904, performing, by the smart node 170, feature extraction on the image data to extract OOIs. The feature extraction may be performed by the deep machine learning network 637. The deep machine learning network 637 may perform feature learning.

The method 900 may include, at block 906, classifying each OOI. The classification may be performed by the deep machine learning network 637, as well. The classifying may include a support vector machine (SVM) mode, or deep neural networks or other computer vision tool. For example, an OOI may be a moving vehicle, a moving object, a stationary vehicle, stationary object, moving actors and stationary actors at any instantiation of monitoring. Classifying different types of OOIs allows various aspects of motion for each OOI to be determined, such as, location, heading, velocity and other relevant information for each classified object of interest. In some scenarios, the deep machine learning network 637 may flag OOIs based on the classification of the OOI.

The method 900 may include, at block 908, for each OOI, forecasting, by the smart node 170, the classified OOI's motion, the motion of an OOI may include a direction of motion. The method 900 may include, at block 909, for each OOI, converting the 2D location data from the image to 3D global coordinates (i.e., latitude, longitude and altitude coordinates) using the vector map data 647. The method 900 may include, at block 910, for each OOI, generating the APD 175 of each OOI. The information associated with the APD 175 of any one OOI in the environment may include the OOI classification, the OOI forecasted motion (including direction), OOI current speed, and/or OOI location data. The method 900 may include, at block 912, communicating, by the smart node 170, the APD 175 associated with each OOI in the intersection and in-range of the smart node 170 to the tracker fusion management server 655. For example, modem 245 (FIG. 2) or other communication device may be used to communicate with the tracker fusion management server 655. The method 900 may include, at block 914, communicating, by the smart node 170 via communication unit 636 monitored intersection data to the remote processing system 650 and/or traffic control server 670 of the remote server system 155. For example, communication unit 636 may be used to communicate the monitored intersection data such as the video stream or still images. The method 900 may include, at block 915, determining whether the OOI is flagged. If the determination at block 915 is "NO," the method 900 may include, at block 918, ending the method. On the other hands, if the determination at block 915 is "YES," the method 900 may include, at block 916, communicating the flagged intersection situational data to remote computing systems such as, without limitation, the local law enforcement computing system 810, the local healthcare services computing system 820 and/or first responder computing system 830 either directly or indirectly. For example, the flagged intersection situational data may be sent to the remote computing system via the remote server system 155.

Figure 9B:
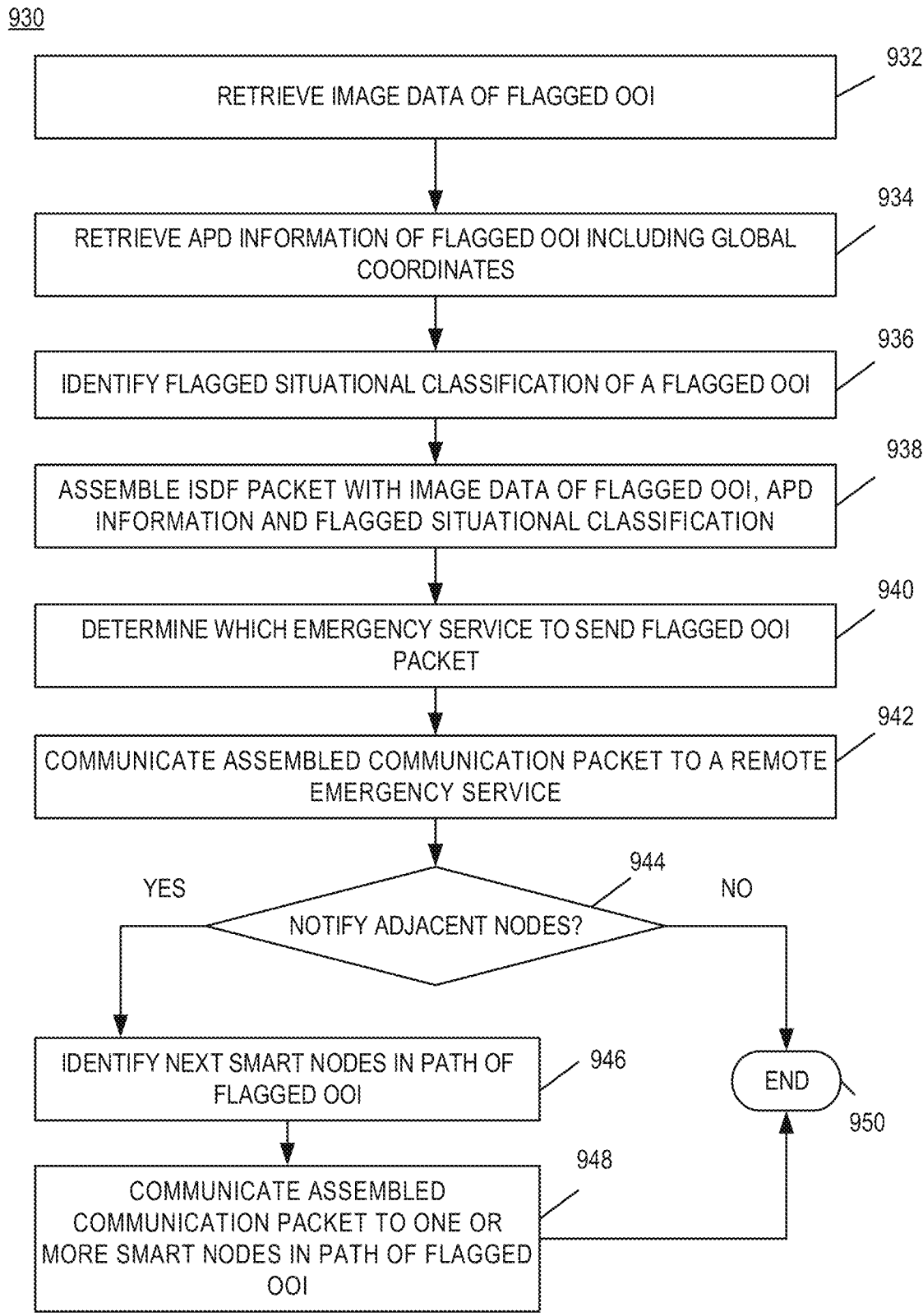
FIG. 9B illustrates a flowchart of a method for communicating flagged objects of interest information to at least one of an adjacent smart node, a local law enforcement computing system, the local healthcare services computing system and/or first responder computing system.

FIG. 9B illustrates a method 930 for communicating flagged OOI information with at least one of an adjacent smart node, the local law enforcement computing system 810, the local healthcare services computing system 820 and/or first responder computing system 830. The method 930 may be performed in block 916 of FIG. 9A. The method 930 may include, at block 932, by the smart node 170, after determining that a particular OOI should be flagged, the image data of the flagged OOI is retrieved. The method 930 may include, at block 934, retrieving the APD information of the flagged OOI including the global coordinates and in some instances, the forecasted motion of the OOI. The method 930 may include, at block 936, identifying a flagged situational classification of a flagged OOI. For example, a flagged situational classification may include a pedestrian needing medical help, for example, if the classification determines that the pedestrian was impacted by a vehicle. In another example, a driver may be classified as needing medical help due to impact of two vehicles. The flagged situational classification may include a vehicle leaving the scene of an accident. The flagged situational classification may include detection of a weapon or in proper use of a weapon by a person other than a law enforcement officer. A flagged situational classification is a classification that requires an emergency type service, for example. The method 930 may include, at block 938, assembling an intersection situational data flag packet with image data of a flagged OOI, APD information and the flagged situational classification. The method 930 may include, at block 940, determining which emergency service (i.e., the local law enforcement computing system 810, the local healthcare services computing system 820 and/or first responder computing system 830) should receive the communication so that the packet can be addressed appropriately, via email, uniform resource locator (URL), internet protocol (IP) address, or other contact information. The method 930 may include, at block 942, communicating the assembled packet using the Internet 850 or WWW to the contact information of one or more remote emergency services.

In some instances, the assembled packet may be sent to multiple services. Furthermore, the local law enforcement computing system may include a computing system for a local law enforcement agency, a state law enforcement agency, and/or federal law enforcement agency. For example, some roads or highways are state controlled while other roads are federally controlled, each with a different responsible law enforcement agency.

The method 930 may include, at block 944, determining whether to notify adjacent nodes of a flagged OOI. If the determination is "NO," the method 930 may end at block 950. If the determination at block 944 is "YES," the method 930 may include, at block 946, identifying the next smart nodes in the predicted path of the flagged OOI or identify adjacent nodes to send the communication packet identifying a flagged OOI. The method 930 may include, at block 948, communicating the assembled communication packet to one or more smart nodes in the imminent path of the flagged OOI or adjacent nodes. Accordingly, the smart nodes in the path of the flagged OOI may keep the emergency service notified of the current position of the flagged OOI.

FIG. 10 illustrates an example system architecture 1000 for a vehicle 105, such as an autonomous vehicle. The vehicle 105 may include an engine or motor 1002 and various sensors for measuring various parameters of the vehicle and/or its environment. Operational parameter sensors that are common to both types of vehicles include, for example: a position sensor 1036 such as an accelerometer, gyroscope and/or inertial measurement unit; a speed sensor 1038; and an odometer sensor 1040. The vehicle 105 also may have a clock 1042 that the system architecture 1000 uses to determine vehicle time during operation. The clock 1042 may be encoded into the vehicle on-board computing device 1010, it may be a separate device, or multiple clocks may be available.

The vehicle 105 also may include various sensors that operate to gather information about the environment in which the vehicle is traveling. These sensors may include, for example: a location sensor 1060 such as a GPS device; object detection sensors such as one or more cameras 1062; a LiDAR sensor system 1064; and/or a radar and or and/or a sonar system 1066. The sensors also may include environmental sensors 1068 such as a precipitation sensor and/or ambient temperature sensor. The object detection sensors may enable the vehicle 105 to detect objects that are within a given distance or range of the vehicle 105 in any direction, while the environmental sensors collect data about environmental conditions within the vehicle's area of travel. The system architecture 1000 will also include one or more cameras 1062 for capturing images of the environment.

During operations, information is communicated from the sensors to an on-board computing device 1010. The on-board computing device 1010 analyzes the data captured by the sensors and optionally controls operations of the vehicle based on results of the analysis. For example, the on-board computing device 1010 may control braking via a brake controller 1022; direction via a steering controller 1024; speed and acceleration via a throttle controller 1026 (in a gas-powered vehicle) or a motor speed controller 1028 (such as a current level controller in an electric vehicle); a differential gear controller 1030 (in vehicles with transmissions); and/or other controllers such as an auxiliary device controller 1054. The on-board computing device 1010 may include an autonomous vehicle navigation controller 1020 configured to control the navigation of the vehicle through an intersection, as will be described in more detail in relation to FIG. 11. In some embodiments, the intersection may include traffic lights. In some embodiments, an intersection may include a smart node 170. In some embodiments, the on-board computing device 1010 may be configured to switch modes (augmented perception mode and non-augmented perception mode) based on whether the APD 175 is available if the vehicle is in-range of an intersection.

Geographic location information may be communicated from the location sensor 1060 to the on-board computing device 1010, which may then access a map of the environment that corresponds to the location information to determine known fixed features of the environment such as streets, buildings, stop signs and/or stop/go signals. Captured images from the cameras 1062 and/or object detection information captured from sensors such as a LiDAR system 1064 is communicated from those sensors) to the on-board computing device 1010. The object detection information and/or captured images may be processed by the on-board computing device 1010 to detect objects in proximity to the vehicle 105. In addition or alternatively, the vehicle 105 may transmit any of the data to a remote server system 155 (FIG. 1) for processing. Any known or to be known technique for making an object detection based on sensor data and/or captured images can be used in the embodiments disclosed in this document. The cameras 1062 may be the same as cameras 1001 and 1002 which are part of the vehicle CVS 115 or different cameras.

Figure 11:
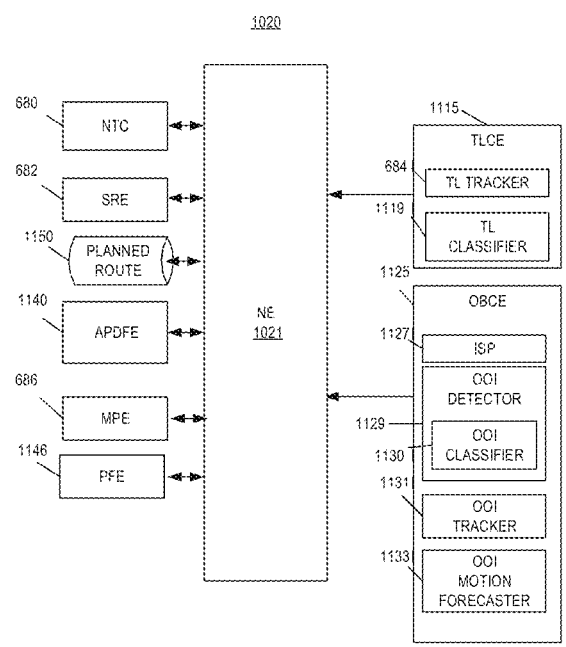
FIG. 11 illustrates a block diagram of an autonomous vehicle navigation controller.

FIG. 11 illustrates a block diagram of an autonomous vehicle navigation controller 1020. The navigation controller 1020 may include navigation engine (NE) 1021 which may be implemented using hardware, firmware, software or a combination of any of these. For instance, the navigation controller 1020 and navigation engine 1021 may be implemented as part of a microcontroller, processor, and/or graphics processing units (GPUs). The navigation controller 1020 and navigation engine 1021 may include or interface with a register and/or data store for storing data and programming instructions, which when executed, performs vehicle navigation based on sensor information, such as from cameras of a computer vision system. The navigation engine 1021 may be an interface to receive and direct data from various engines to be described below for use by the engines to assist in the navigation and control of the vehicle by the navigation controller 1020. The navigation engine 1021 may store route information such as planned route information in planned route member 1150.

The navigation controller 1020 may include a traffic light control engine (TLCE) 1115 interfaced with the navigation engine 1021. The traffic light control engine 1115 may be implemented using hardware, firmware, software or a combination of any of these. For instance, the traffic light control engine 1115 may be implemented as part of a microcontroller, processor, and/or GPU. The traffic light control engine 1115 may include or interface with a register and/or data store for storing data and programming instructions, which when executed, performs traffic light classification based on processed sensor information, such as computer vision system information, associated with an intersection being approached by a vehicle 105.

The traffic light control engine 1115 may include a traffic light tracker 1117 and a traffic light classifier 1119. According to various embodiments, a digital image such as a raster image may be captured by the vehicle CVS 115 (FIG. 1) which includes a traffic signal device 130. The traffic signal device shown in FIG. 1 includes several traffic signal elements 135. The traffic signal elements 135 are dynamic in that they can be changed between at least two states to transmit traffic instructions to one or more drivers, and different types of signal elements 135 may be present in a single traffic signal device 130. Examples of traffic signal elements 135 may include, for example, a red light, a yellow light and a green light. Other examples include lights with directional arrows (such as arrows pointing left or right), other symbols (such as a symbol of a person walking), or words. In each of these examples, each light can be switched between an off state and an on state. Lights may be Light Emitting Diodes (LEDs), bulbs, and/or any other suitable lighting element that conveys the state of each traffic signal element 135 of each traffic signal device 130 of an intersection, for example. According to various embodiments, the light may be reflective in nature.

The signal elements 135 may include circular lights and arrow lights. However, the features of each of the signal elements 135 may be any of various signal element features such as, for example, a green light, a yellow light, a red light, a circular light, a left arrow light, a right arrow light, an light having an arrow positioned in an arbitrary direction, a forward arrow light, a flashing yellow light, a flashing red light, a U-turn light, a bicycle light, an X-light, and/or any other suitable traffic signal element features. It is further noted that the traffic signal device 130 may include any suitable number of signal elements 135, having various positions on the face of the traffic signal device 130. The traffic signal elements 135 correspond to a designated light fixture configured to transmit traffic instructions to one or more drivers. The classification state of the traffic signal face includes a classification state based on one or more operational states of: a green light state; a yellow light state; a red light state; a circular light state; a left arrow light state; a right arrow light state; a forward arrow light state; a flashing yellow light state; and a flashing red light state. The traffic light classifier 1119 receives digital image data which is subsequently processed using an image processing system (IPS) such as described in FIG. 2. The traffic light classifier 1119 may then perform feature extraction and machine learning to classify the current state of the traffic light. According, to the classification state the navigation and control of the vehicle may be controlled to accelerate, decelerate, stop, turn left, turn right, and/or proceed in a straight direction, for example. The system may use traffic light classifiers such as those that are known in the art. Thus, no further discussion related to TL classifiers will be provided. Information received from the gateway 660 may be used in the classification process and by the smart routing engine.

The traffic light tracker 684 may track the traffic light of an imminent intersection for a duration of time until the vehicle passes through the intersection by tracking the classification state of the traffic light. The tracked classification states of a traffic light by the vehicle in-range may change one or more times before the vehicle has successfully passed through the traffic light. The term "passed through the traffic light" includes, performing one of by the vehicle, turning right or left at a traffic light intersection and driving straight through the intersection without the need to make a turn.

The navigation controller 1020 may include an object-based control engine (OBCE) 1125 interfaced with the navigation engine 1021. The object-based control engine 1125 may be implemented using hardware, firmware, software or a combination of any of these. For instance, the object-based control engine 1125 may be implemented as part of a microcontroller, processor, and/or GPU. The object-based control engine 1125 may include or interface with a register and/or data store for storing data and programming instructions, which when executed, performs object detection based on processed sensor information, such as computer vision system information and track stationary and moving objects, vehicles and actors to and along an imminent path to be driven by the vehicle 105.

The object-based control engine 1125 may include an image signal processor 1127, OOI detector 1129, OOI classifier 1130 and an OOI tracker 1131. The object-based control engine 1125 may include an OOI motion forecaster 1135. The OOI detector 1129, OOI tracker 1131 and OOI motion forecaster 1135 operate in a similar manner as the smart node as described in relation to FIG. 6A. For example, the object-based control engine 1125 may include a processing channel for each camera on the vehicle similar to channels 620 (FIG. 6A) which include an ISP 630, deep machine learning network, image tracker, global time module 640 and map projection module 645 as previously described. Therefore, further discussion will not be provided. The OOI detector 1129 may include the OOI classifier 1130 where the OOI would be classified as stationary or moving. The OOI detector may detect multiple OOIs or a group OOIs in at least one image. For example, a person would be an OOI. Additionally, an OOI which is a bicycle being driven by the person may be two OOIs for example. These two OOIs may be grouped into a single OOI, such as a moving OOI. The motion forecaster 1133 may forecast motion of the bicycle based on the type of vehicle, which in this instance is a bicycle. In some scenarios, the OOI classifier 1130 of the node 170 may detect and classify mobility assist devices associated with a moving OOI. The mobility assist device classification may be used to predict or forecast the speed of motion of the OOI using the mobility assist device. Mobility assist devices may include wheelchairs, walkers and canes.

The object-based control engine 1125 may include a processor, such as a GPU for performing the processing channel for each camera of the vehicle CVS and this GPU may be part of the navigation controller 1020. In other words, in some embodiments, the vehicle CVS and the navigation controller may share a processor.

The object-based control engine 1125 may be used during the operation of the vehicle 105 such that OOIs captured along a driven portion of the imminent path are extracted, identified, classified, located, and the motion of the OOI is forecasted to avoid collusion of the vehicle 105 with any of the OOIs and control the navigation of the vehicle. An OOI may be determined to be stationary or have zero motion and zero direction. For example, assume that the OOI data from the object-based control engine 1125 may be merged with APD 175 of each OOI detected by an in-range smart node 170 for operation of the navigation engine 1021 in an augmented perception mode, if available. Otherwise, the navigation engine 1021 may be operated in a non-augmented perception mode such as if augmented perception data is not available.

The navigation controller 1020 may include an APD fusion engine (APDFE) 1140 to fuse OOI data from the object-based control engine 1125 with the received APD 175 of at least one in-range smart node 170 (FIG. 1). The fusion engine 1140 may be interfaced with the navigation engine 1021. The navigation controller 1020 may include the networked track client 680 and the smart routing engine 682, previously described in relation to FIG. 6B, interfaced with the navigation engine 1021. The APD fusion engine 1140 may receive augmented local tracks information from the tracker fusion management server 655.

The navigation controller 1020 may include a motion planning engine (MPE) 686 and a path follower engine (PFE) 1146 each of which includes machine learning algorithms for planning the motion of the vehicle based on various parameters of a to be followed path along a planned route from an origination location to a destination location of global coordinate system. The parameter may include, without limitation, motor vehicle operation laws of a jurisdiction (i.e., speed limits), objects in or surrounding a path of the vehicle, scheduled or planned route, traffic lights of intersections, and/or the like. The smart routing engine 682 may interface with the motion planning engine 686 and path follower engine 1146 so that the next motion control instructions to be executed is updated based on current traffic conditions, such as traffic congestion, or fleet control information. Motion planning control generated by the motion planning engine 686 may control acceleration, velocity, braking, and steering of the vehicle to avoid a collision at an intersection or as a vehicle travels along an imminent path.

The motion planning engine 686 and a path follower engine 1146 may also be implemented using hardware, firmware, software or a combination of any of these and interfaced with the navigation engine 1021. For instance, the motion planning engine 686 and a path follower engine 1146 may be implemented as part of a microcontroller or processor. The motion planning engine 686 may include or interface with a register and/or data store for storing data and programming instructions, which when executed, performs motion planning of the vehicle in route. The path follower engine 1146 may include or interface with a register and/or data store for storing data and programming instructions, which when executed, performs path following of a planned route to be driven by the vehicle. The imminent path may identify the planned route yet to be taken or driven from an origination location to a destination location according to a global coordinate system. The imminent path of the planned route may be updated based on, for example, traffic conditions, road closures, or emergency situations. The motion planning serves to direct the vehicles operation at every instance along an imminent path being followed. If a planned route is updated, the imminent path may be part of the planned route or the updated route.

However, the fusion engine 1140 may determine that all APD is needed for the vehicle. For example, the fusion engine 1140 may extract the location data of any OOI associated with APD 175 to determine if any APD represents an OOI which is hidden from the vehicle CVS 115 of a vehicle. In other words, receiving location coordinates of an existing OOI which is not also being tracked by the object-based control engine 1125 may cause the APD information from at least one smart node to be flagged for incorporation into the machine learning algorithms of the motion planning engine 686 to which plans ahead the motion (i.e., speed and direction) of the vehicle. In some embodiments, OOIs with matching location coordinates already being tracked by an approaching vehicle may be sorted or removed from fusion to adjust the motion of the vehicle determined in part by motion parameters under the control by the motion planning engine 686, the navigation under the control by the smart routing engine 682, or the imminent path to be travelled under the control of the path follower engine 1146.

The APD 175 may include forecasted motion information which is not available to the vehicle which may be extracted by the fusion engine 1140. In a previous example, an OOI may be a stationary vehicle which may be forecasted to imminently move or transition to a moving vehicle. Thus, the fusion engine 1140 may extract any APD 175 associated with an OOI associated which is forecasted to move or transition to a moving object or vehicle. In another example, the fusion engine 1140 may determine that the determined coordinates of an OOI at the vehicle may be different from the coordinates determined by the smart node. Accordingly, the fusion engine 1140 may update its coordinate of the OOI as determined by the vehicle with the coordinates determined by the smart node, if appropriate. Still further, the fusion engine 1140 may determine that other APD information from a node associated with an OOI is different from information derived by the vehicle's own classification. The fusion engine 1140 may fuse the APD information associated with a node with information derived by the on-board processing at the vehicle. These examples are not intended to be an exclusive list of examples of data fusion. As discussed previously, the APD information may fused from more than one smart node. As a vehicle approaches an intermediate intersection without a smart node, certain APD information of nodes in the smart node network 800 may be fused to aid the vehicle passing through the intermediate intersection.

In some embodiments, the APD information received, by the navigation engine, may be directed to and used by the motion planning engine 686, the smart routing engine 682 or the path follower engine 1146 such that offsets in location data or forecasted motion (i.e., speed and direction) may be adjusted as appropriately for use in the machines learning algorithms of the engines 686, 682 and 1146, for example.

In the various embodiments discussed in this document, the description may state that the vehicle or on-board computing device of the vehicle may implement programming instructions that cause the on-board computing device of the vehicle to make decisions and use the decisions to control operations of one or more vehicle systems. However, the embodiments are not limited to this arrangement, as in various embodiments the analysis, decision making and or operational control may be handled in full or in part by other computing devices that are in electronic communication with the vehicle's on-board computing device. Examples of such other computing devices include an electronic device (such as a smartphone) associated with a person who is riding in the vehicle, as well as a remote server system that is in electronic communication with the vehicle via a wireless communication network. The processor of any such device may perform the operations that will be discussed below.

Figure 12:
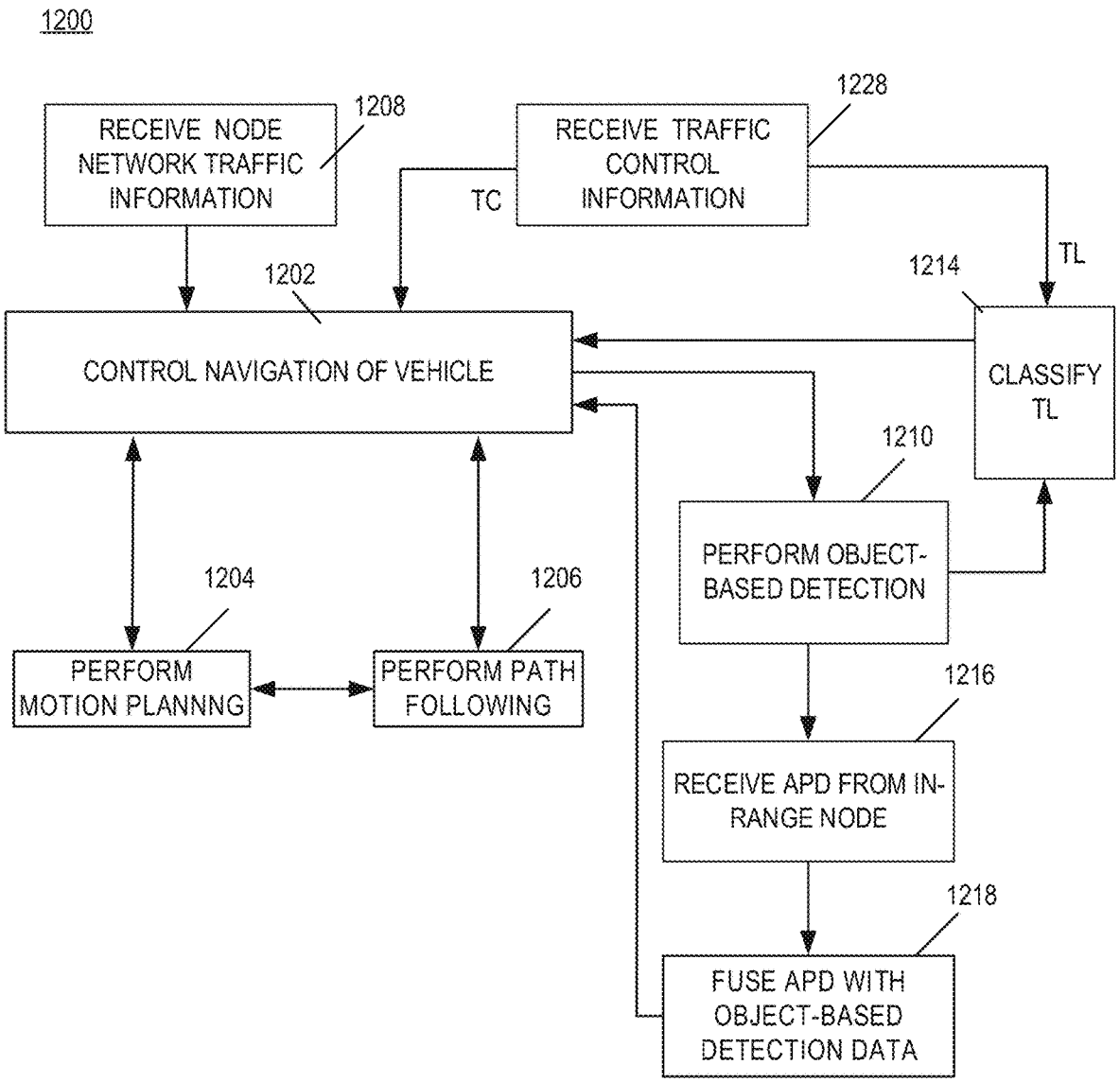
FIG. 12 illustrates a flowchart of a method of navigating a vehicle with augmented perception data from a smart node.

FIG. 12 illustrates a flowchart of a method 1200 of navigating a vehicle with augmented perception data from a smart node 170 and/or remote processing system 650. The method 1200 may include, at block 1202, controlling the navigation of a vehicle 105. This may be based on an imminent path having an origination location and destination location. At block 1204, the method 1200 may perform motion planning. At block 1206, the method 1200 may perform a path following function based on the imminent path. The blocks 1204 and 1206 may receive updates from each other so that the current instantiation of the path following instruction may use current location information so that the next instantiation of motion instruction is selected to seamlessly control the motion by the vehicle to follow the imminent path. The imminent path may include a set of global geographical coordinates along a path from a point of origination to one of an intermediate destination or a final point of a destination. Based on traffic control, the set of global geographical coordinates may be updated so that the imminent path is adjusted to cause the vehicle to travel along a path with less traffic congestion. In some instances, any deviation from the imminent path may cause the vehicle to eventually merge back to points along the imminent path to the final point of the destination as necessary.

The method 1200 may include, at block 1208, receiving at least one node network traffic information, such as from a remote server system 155 or remote processing system 650. Thus, received network traffic information, associated with nodes, may be used to control the navigation of the vehicle by updating the imminent path, for example, which effectuates changes to the path following instructions and motion planning instructions to control the navigation of the vehicle by the navigation controller. The remote server system 155 or remote processing system 650 may be configured to determine a traffic congestion condition at least one node along the imminent path based on received video stream representative of the network traffic information of the node and APD information from at least one node.

At block 1210, the method may perform object-based detection. At block 1214, the method may include classifying a TL classification state, if the image data is representative of a traffic light face. The TL classification state is sent to block 1202. The image data may include OOI and/or traffic light image data captured by the vehicle CVS 115. The OOI is meant to represent objects in the environment other than traffic lights. At any intersection, motion through the intersection may be based one at least one of the TL classification state and at least one detected OOI. For example, although the vehicle may have the right of way based on the TL classification state, the vehicle may be required to yield to a pedestrian in a cross-walk, by way of non-limiting example, in the imminent path of the vehicle.

The method 1200 may include, at block 1216, receiving APD information from at least one in-range node 170 via the remote server system 155 or remote processing system 650. The method 1200 may include, at block 1218, fusing the received APD information with the OOI detected at block 1210 other than traffic light face data. The fused data from block 1218 may be used in control of the navigation of the vehicle 105.

The method 1200 may include, at block 1228, receiving traffic control information. The operations of block 1214 may use traffic control information, received at block 1228 from the gateway server 660. The traffic control information may include information associated with TL states. Block 1202 may receive traffic control information, such as TC information from the gateway server 660.

Figure 13:
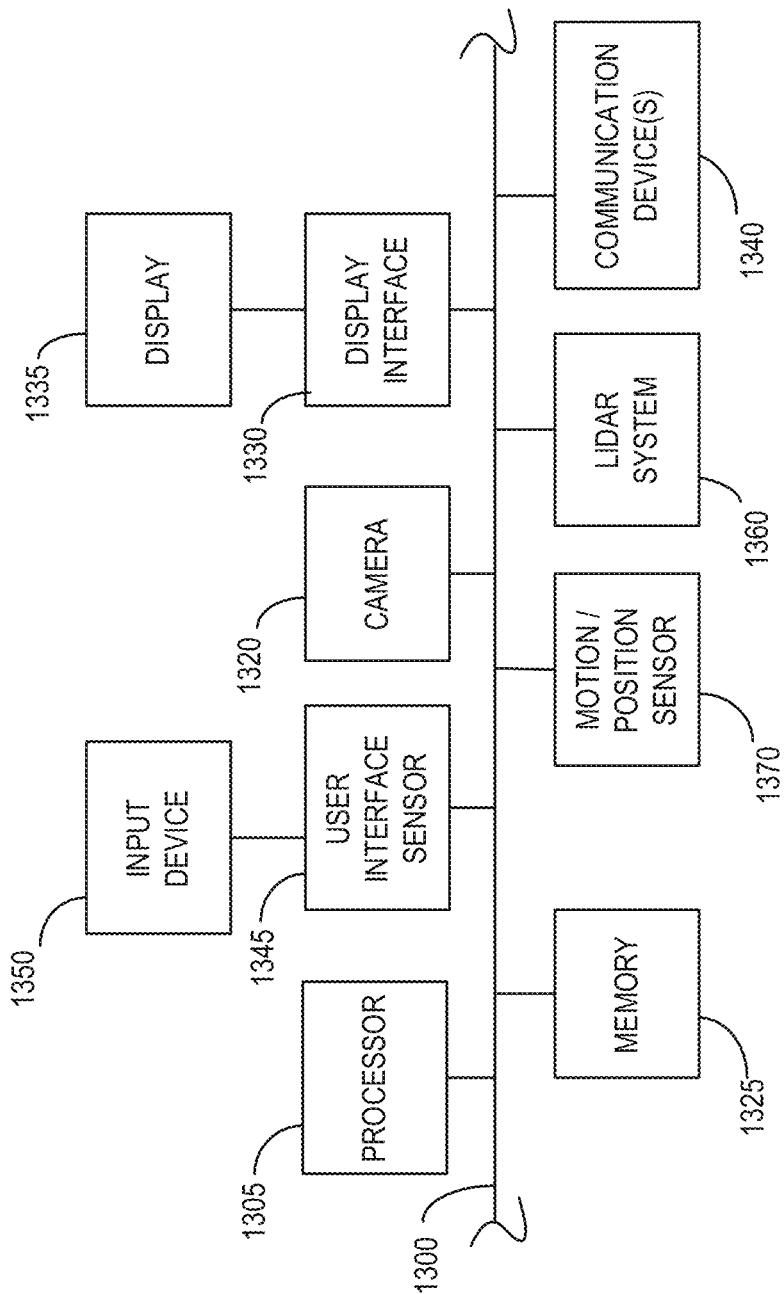
FIG. 13 illustrates a block diagram that illustrates various elements of a possible electronic subsystem of an autonomous vehicle and/or external electronic device.

FIG. 13 depicts an example of internal hardware that may be included in any of the electronic components of the system, such as internal processing systems of the vehicle, remote processing systems, or remote servers. An electrical bus 1300 serves as an information highway interconnecting the other illustrated components of the hardware. Processor 1305 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a GPU, a remote server, or a combination of these. Read only memory (ROM), random access memory (RAM), flash memory, hard drives and other devices capable of storing electronic data constitute examples of memory devices 1325. A memory device 1325 may include a single device or a collection of devices across which data and/or instructions are stored. Various embodiments of the invention may include a computer-readable medium containing programming instructions that are configured to cause one or more processors to perform the functions described in the context of the previous figures.

An optional display interface 1330 may permit information from the bus 1300 to be displayed on a display device 1335 in visual, graphic or alphanumeric format, such on an in-dashboard display system of the vehicle. An audio interface and audio output (such as a speaker) also may be provided. Communication with external devices may occur using various communication devices 1340 such as a wireless antenna, a radio frequency identification (RFID) tag and/or short-range or near-field communication transceiver, each of which may optionally communicatively connect with other components of the device via one or more communication system. The communication device(s) 1340 may be configured to be communicatively connected to a communications network, such as the Internet, a local area network or a cellular telephone data network.

The hardware may also include a user interface sensor 1345 that allows for receipt of data from input devices 1350 such as a keyboard or keypad, a joystick, a touchscreen, a touch pad, a remote control, a pointing device and/or microphone. Digital image frames also may be received from a camera or image capture device 1320 that can capture video and/or still images. The system also may receive data from a motion and/or position sensor 1370 such as an accelerometer, gyroscope or inertial measurement unit. The system also may receive data from a LiDAR system 1360 such as that described earlier in this document.

Web-based servers may have running thereon web-server applications stored in memory. Any servers described in this document may include multiple servers implemented in a web-based platform. In some scenarios, the servers may provide cloud based computing.

Figure 14:
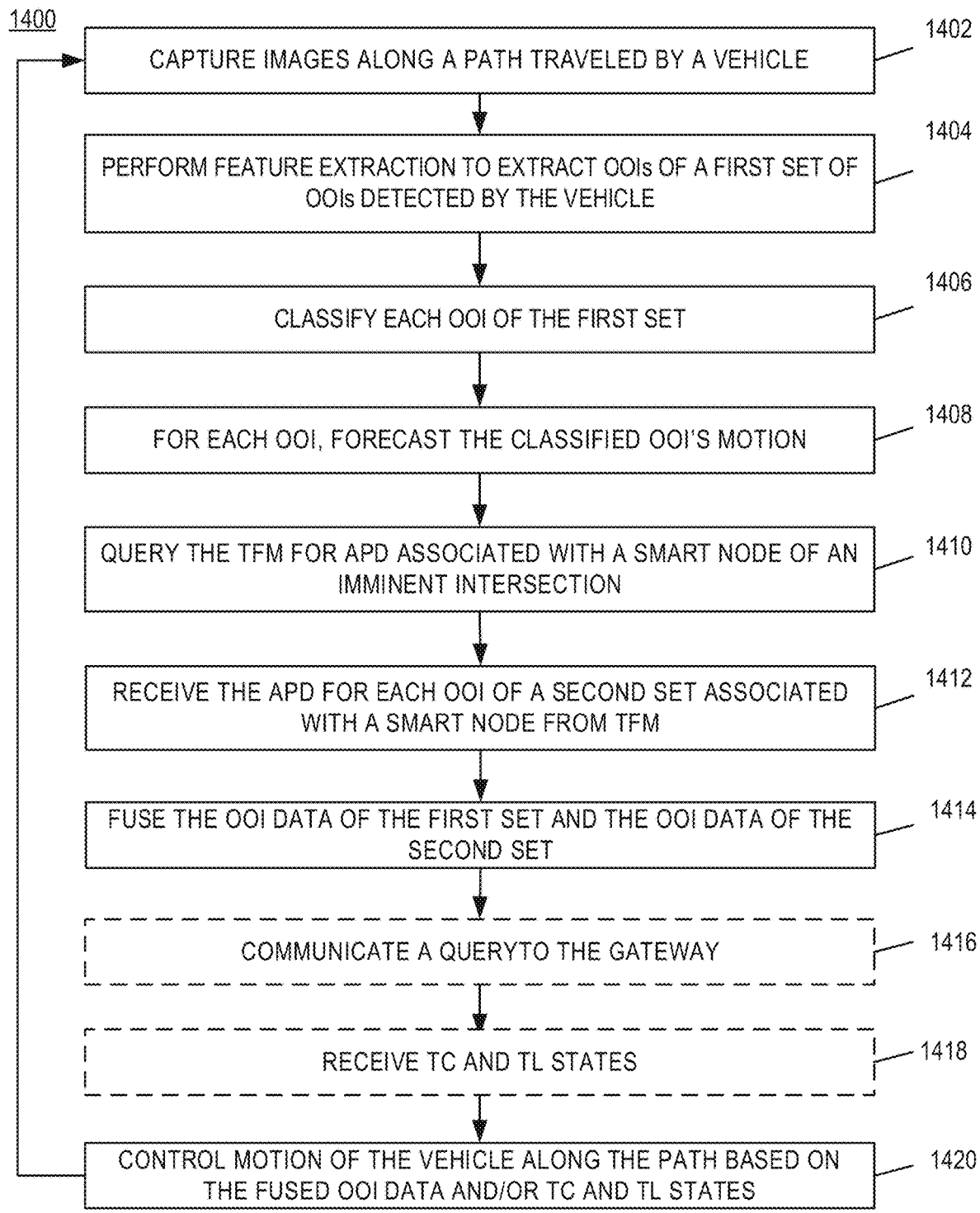
FIG. 14 illustrates a flowchart of a method of autonomous navigation of a vehicle in an environment with smart nodes.

FIG. 14 illustrates a flowchart of a method 1400 of autonomous navigation of a vehicle 105 in an environment with smart nodes. The method 1400 will be described in relation to FIG. 6B. The method 1400 may include, at block 1402, capturing images along a path traveled by a vehicle 105. The vehicle 105 may capture images from multiple FOVs, as best seen in FIG. 5. The images may be captured by the cameras of the vehicle CVS 115 (FIG. 1). The method 1400 may include, at block 1404, performing feature extraction on the image data to extract OOIs of a first set by the vehicle 105. The feature extraction may be performed by a deep machine learning network. The deep machine learning network may perform feature learning. Example feature extraction algorithms has been described above.

The method 1400 may include, at block 1406, classifying each OOI of the first set. The classification may be performed by the deep machine learning network, as well. The classifying may include a support vector machine (SVM) mode, or deep neural networks or other computer vision tool. For example, an OOI may be a moving vehicle, a moving object, a stationary vehicle, stationary object, moving actors and stationary actors at any instantiation along a path of the vehicle. Classifying different classes of OOIs of the first set allows various aspects of motion for each OOI to be determined, such as, location, heading, velocity and other relevant information for each classified object of interest.

The method 1400 may include, at block 1408, for each OOI of the first set, forecasting by the vehicle 105 the classified OOI's motion, the motion of an OOI may include a direction of motion. The method 1400 may include, at block 1410, querying the tracker fusion management server 655 (FIG. 6B) for APD 175 of each OOI of a second set in the vision range of a smart node 170 of an imminent intersection in the path of the vehicle. In some embodiments, the second set in the vision range of a smart node may include a plurality of second sets, each second set corresponding to a smart node which may be in the imminent path of a vehicle to a predetermined destination.

The method 1400 may include, at block 1412, receiving the APD 175 of each OOI of the second set from the tracker fusion management server 655. The information associated with the APD 175 of any one OOI in the environment may include the OOI classification, the OOI forecasted motion (including direction), OOI current speed, and/or OOI location data. The APD information may include global coordinates. As previously described, depending on the intersection, the APD of the second set from the tracker fusion management server 655 may be derived from multiple smart nodes which may have adjacent or partially overlapping node VRs.

The method 1400 may include, at block 1414, fusing the APD 175 associated with each OOI of the second set from the tracker fusion management server 655 with the OOI data of the first set. The method 1400 may include, at block 1416, communicating to the gateway 660 (FIG. 6B) a query for traffic control information. The query may include position and route information associated with the vehicle and a planned route. The method 1400 may include, at block 1418, receiving traffic conditions and traffic light states information from the gateway 660, in response to the query. Blocks 1416 and 1418 are shown in dashed lines to denote that the blocks are optional or may be skipped in certain instantiations.

The method 1400 may include, at block 1420, based on the fused OOI data of the first set and the second set and/or the traffic condition and traffic light states, controlling the motion of the vehicle along the imminent path including navigation through an intersection with a traffic signal. In other scenarios, the intersection may not include a traffic light. Hence, at least the motion planning engine of the vehicle would still use the fused OOI data of the first set from the vehicle and the OOI data of the second set from at least one smart node to control the motion of the vehicle. From block 1420, the method may return to block 1402. As the vehicle 105 travels in a direction toward the next intersection with or without a smart node, the vehicle 105 may query the tracker fusion management server 655 for the current APD associated with the next intersection or smart node.

Figure 15:
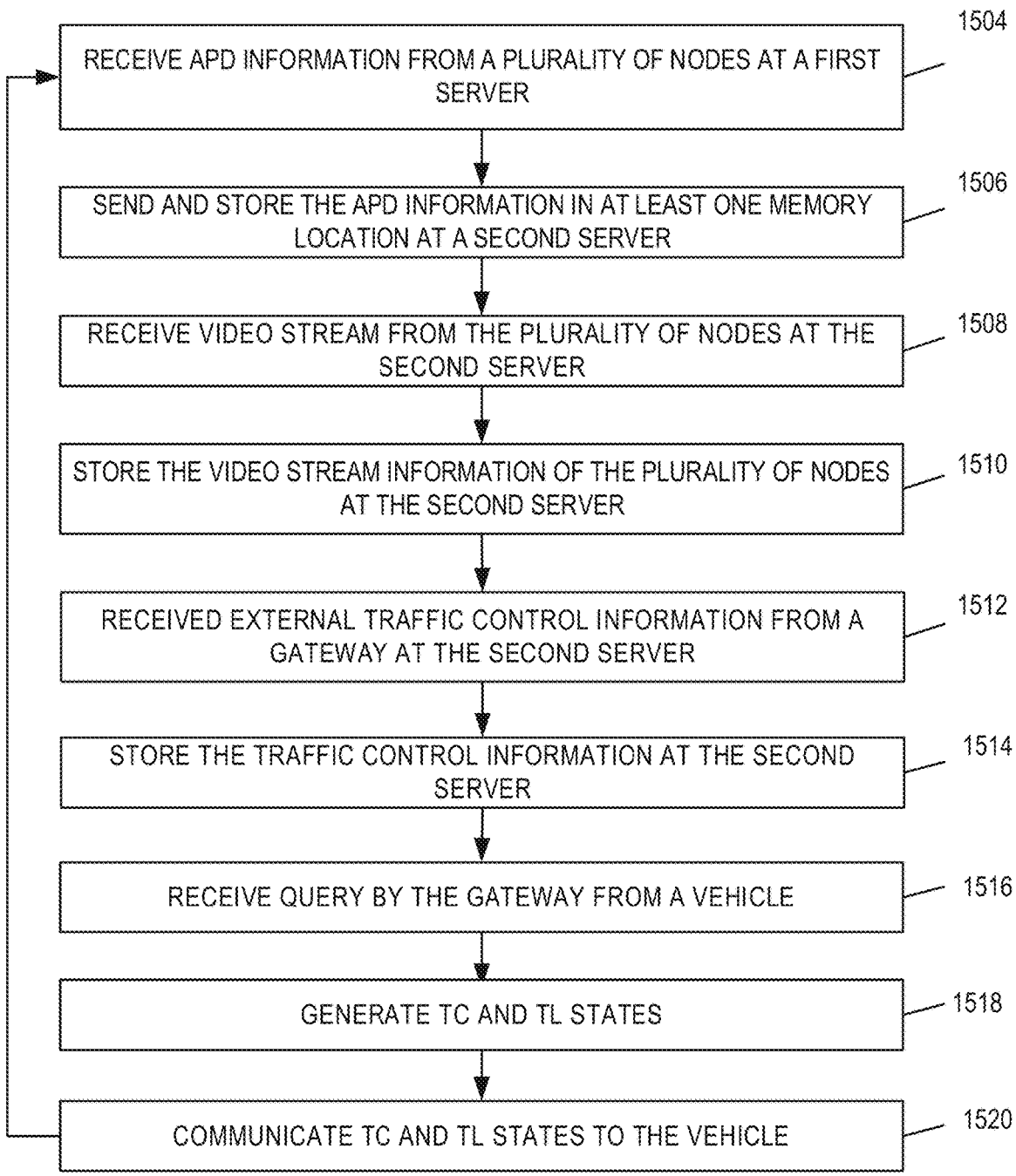
FIG. 15 illustrates a flowchart of a method for controlling one or more vehicles of a fleet based on image data and classified objects of interest at intersections in a geographical area.

FIG. 15 illustrates a flowchart of a method 1500 for controlling one or more vehicles 105 of a fleet based on image data and classified OOIs at intersections in a geographical area. The method 1500 will be described in relation to FIG. 6B. The method 1500 may include, at block 1504, receiving APD information from a plurality of nodes at a first server 1504. The method 1500 may include, at block 1506, storing the APD information in at least one memory location of memory 673 at a second server (i.e., traffic control server 670 of FIG. 6B). The method 1500 may include, at block 1508, receiving video streams from the plurality of nodes at the second server (i.e., traffic control server 670 of FIG. 6B). The method 1500 may include, at block 1510, storing the video streams in at least one memory location of memory 673 at the second server. The method 1500 may include, at block 1512, receiving external traffic control information from a gateway server 660 (FIG. 6B) at the second server (i.e., traffic control server 670 of FIG. 6B). The external traffic control information may include information associated with the timing control of traffic lights and/or schedules of changing the traffic signals, such as to control traffic during certain traffic conditions associated with roads and intersections in a geographical area. The external traffic control information may include information associated with a traffic condition, such as without limitation, traffic congestion, accidents and other traffic condition information. By way of non-limiting example, information associated with the traffic conditions may include data associated with one or more of the number of vehicles in a particular lane, blocked lanes, road closures, road construction and average speed of vehicles in a particular lane. The external traffic control information may be obtained by aerial surveillance and/or traffic monitors, for example.

The method 1500 may include, at block 1514, storing the external traffic control information in at least one memory location of or at least one database in memory 673 at the second server. The method 1500 may include, at block 1516, receiving a query from one or more vehicles 105 at the gateway server 660 (FIG. 6B). Memory 673 may include a plurality of databases for APD information, TC information and TL states. The databases may be distributed, relational, linked or separate.

The method 1500 may include, at block 1518, generating traffic control information, such as at least one of TC information and TL states. The TC information and/or TL states may be based on the query from the vehicle. The query may ask or search for current traffic control information, such as one of current TC information and/or TL states for an imminent path or a longer path which includes the imminent path. The search may generate resultant traffic control information, resultant TC information or resultant TL states. In various embodiments, the vehicle may communicate a single query for both TC information and TL states for the planned route. In various embodiments, the vehicle may communicate separate queries, such as a TL state's query and a TC query for one of the planned route or imminent path. The TC information may be stored in a database for TC information. The TL states may be stored in a database for TL states. The databases may the combined, linked or separate.

The method 1500 may include, at block 1520, communicating traffic control information, such as at least one of the TC information and TL states, to the vehicle 105 in response to the query or queries. The traffic control information may be sent via the gateway server 660 to the smart route engine 682. The TC information and/or TL states may serve to cause the planned route of a vehicle 105 to be adjusted or updated. The TL states may be used to train the TL classifier with the current TL states for any intersection with a traffic light in the imminent path. The method from block 1520 may loop back to block 1504. The traffic control information may be retrieved by the gateway server from the second server 670 and/or accessed from the traffic control infrastructure 679.

Figure 16:
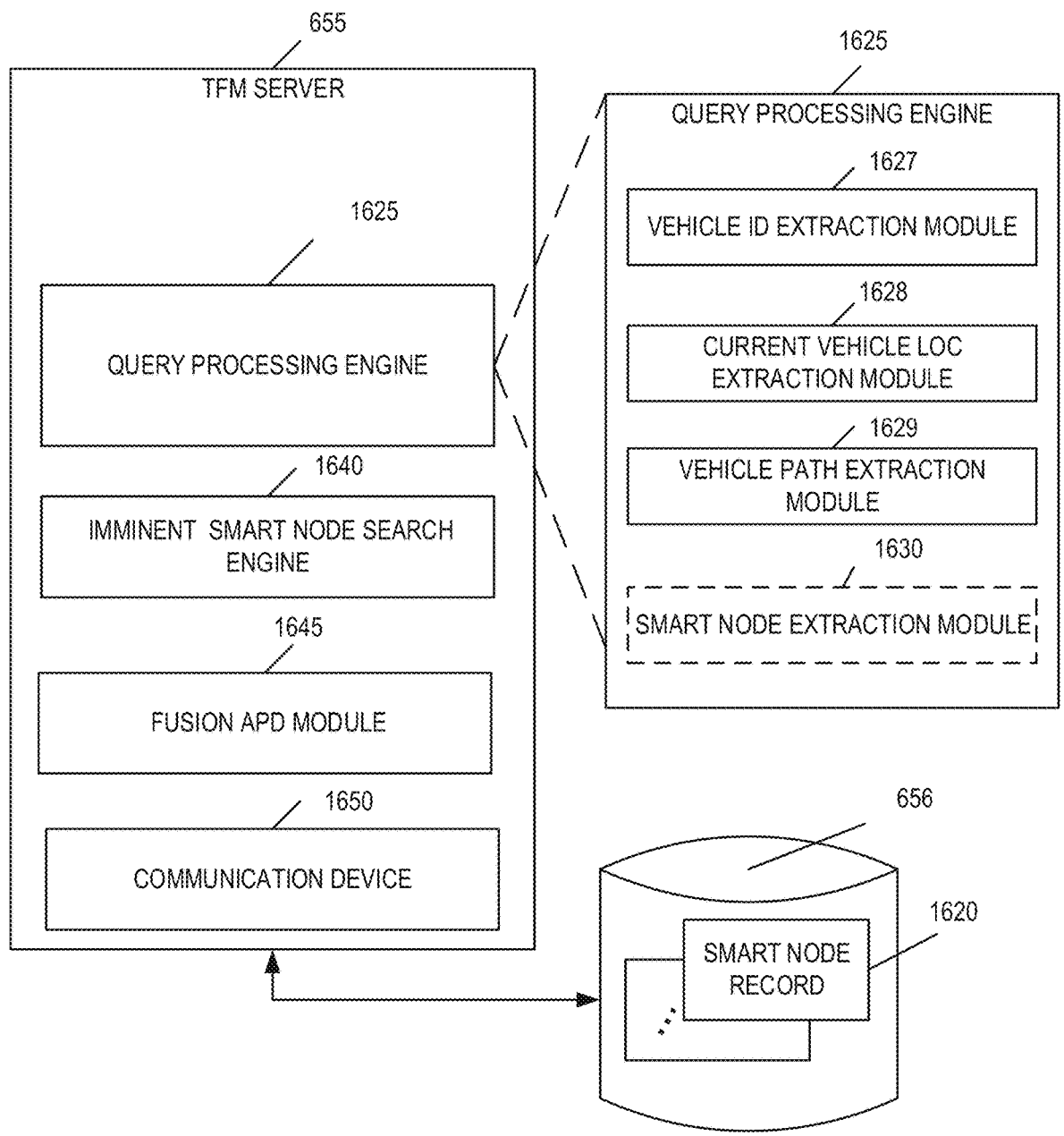
FIG. 16 illustrates a block diagram of a tracker fusion management server.

FIG. 16 illustrates a block diagram of a tracker fusion management server 655. The tracker fusion management server 655 may be coupled to memory 656 configured to store therein a plurality of smart node records 1620 and programming instructions for carrying out the procedures described in this document. Each smart node record 1620 is associated with a different smart node, as will be described in relation to FIG. 17.

Figure 17:
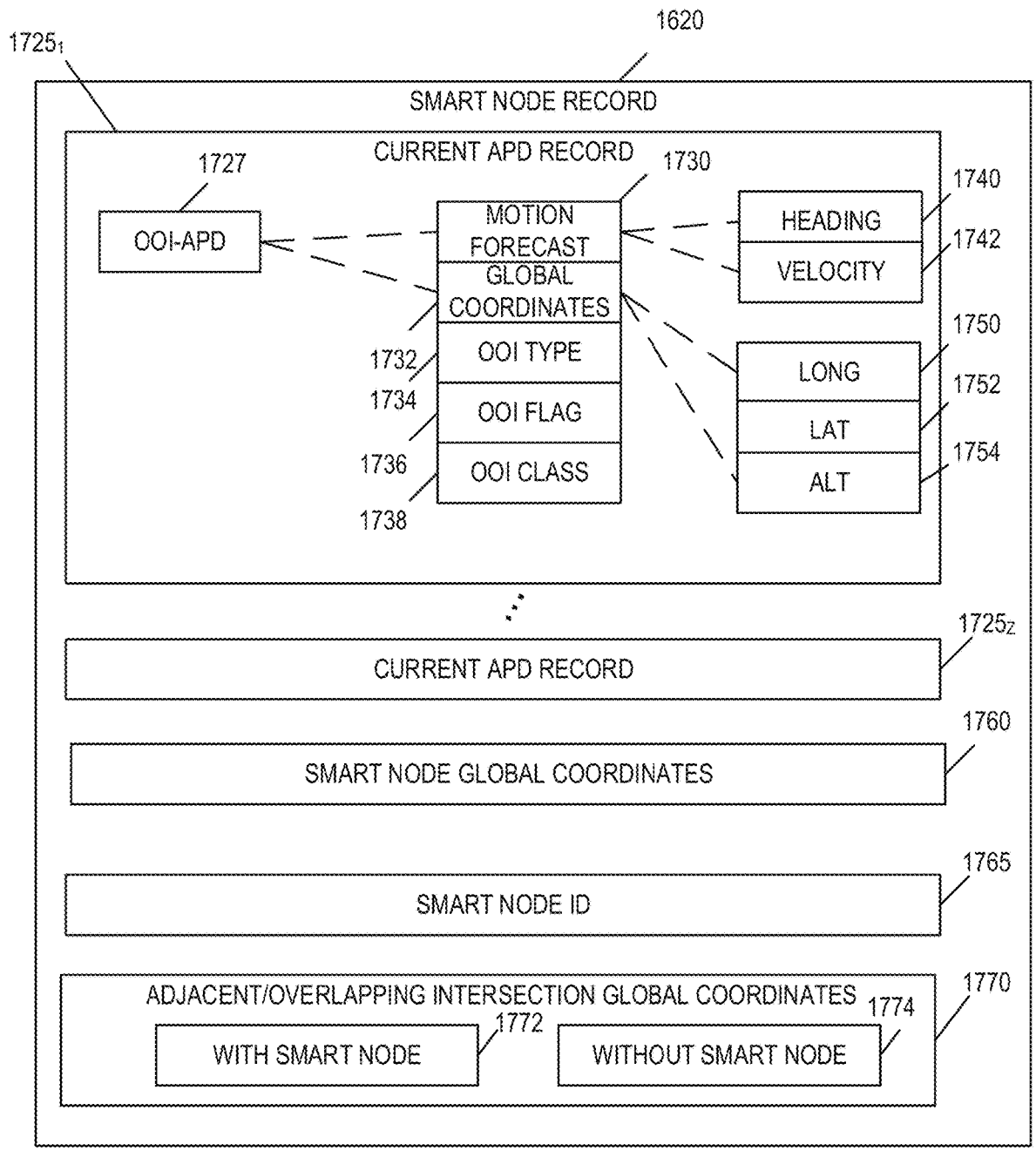
FIG. 17 illustrates a block diagram of a smart node record stored at a tracker fusion management server.

Referring now to FIG. 17, a smart node record 1620 will be described in relation to FIG. 6B. The tracker fusion management server 655 may store received information from a smart node in memory 656. The information may be received continuously or periodically. The smart node may only send information to update the record that has changed since the previous update. The smart node record 1620 includes information associated with the APD 175 detected in-range of the smart node. The current APD record $1725_1$ for a first OOI may include up-to-date OOI-APD information 1727. The OOI-APD information 1727 may include information associated with motion forecast 1730 of the first OOI. The motion forecast 1730 may include information associated with a heading 1740 (i.e., direction) and velocity 1742 of the OOI, for example.

The OOI-APD information 1727 of the first OOI may include global coordinates 1732, OOI type 1734, OOI flag data 1736, and OOI classification data 1738, by way of non-limiting example. A type of OOI may be a vehicle, an object and actor at any instantiation of monitoring. A classified OOI may be a moving vehicle, a moving object, a moving actor, a stationary vehicle, a stationary object, and a stationary actor at any instantiation of monitoring, for example. Multiple OOIs may be further grouped together into a group type which may then be classified. The global coordinates 1732 may include information representative of a longitude coordinate 1750, a latitude coordinate 1752 and an altitude coordinate 1754. The OOI flag data 1736 may include information representation of whether a flag is set or not set. Furthermore, the situational flag (i.e., OOI flag data 1736) may include other information indicative of a type of situational flag to provide situational awareness.

The smart node record 1620 may include a plurality of current APD records from $1725_1 \ldots 1725_z$ where Z is a non-zero integer. Some OOIs may move out of range of the smart node 170. Accordingly, the smart node record 1620 is updated to remove OOI-APD information for any OOI that has moved out-of-range of the smart node 170. In some scenarios, at any instantiation, a smart node 170 may have no OOIs in their range. Accordingly, the current APD record may include no OOI-APD entries.

The smart node record 1620 may include information associated with the smart node's global coordinates 1760. The global coordinates in some instances may include the coordinates in the vision field of the node VR. The smart node record 1620 may include information associated with the smart node's identification 1765. The smart node identification 1765 may include at least one of an internet protocol (IP) address information, and a media access control (MAC) address information. The smart node record 1620 may include security information. The smart node record 1620 may include information including global coordinates 1740 of the vision field associated with adjacent/overlapping intersections with smart nodes 1772 and/or without smart nodes 1774.

Returning again to FIG. 16, the tracker fusion management server 655 may include a query processing engine 1625 configured to process the query from vehicle 105 (FIG. 6B. The communication packet from the vehicle 105 and received by the communication device 1650 may include a vehicle identifier (ID), current vehicle location data, and imminent planned vehicle path information. The query processing engine 1625 may include one or more of a vehicle ID extraction module 1627, a current vehicle location extraction module 1628 and vehicle path extraction module 1629 to extract the fields of the query search information. The extracted information by tracker fusion management server 655 may be used to develop a search request for searching the node records to generate resultant APD for the imminent path. The TFM server 655 may extract from the query information associated with the vehicle's imminent path, such as the next L meters where L is a non-zero number. The value "L" may be variable. For example, when approaching an intersection with a smart node. The value "L" may decrease and may be a function of the distance between smart nodes.

The tracker fusion management server 655 may include an imminent smart node search engine 1640 to develop a search request for the APD information stored in memory 656 from one or more proximate smart nodes, for example, associated with the extracted vehicle path information. There term "proximate" may be a function of a comparison of the smart node coordinates 1760 and the vehicle's current coordinates and/or coordinates along the imminent path. In some scenarios, the vehicle may have a list of smart nodes and the related coordinates. Accordingly, in some scenarios, the vehicle may perform on-board processing to determine that one or more smart nodes are imminent along the imminent path and provide information. The query sent to the tracker fusion management server 655 from the vehicle may include information in the query associated with a smart node as determined by the vehicle. For example, assume that the L is equal to 100. Then, the query may request information for the next 100 meters of the planned route. The "next 100 meters" corresponds to the current imminent path. The query may indicate an intermediate point of origination and an intermediate point of destination. The distance between intermediate reference points, denoted as the intermediate point of origination and the intermediate point of destination, correspond to the distance of the imminent path. The vehicle may receive available APD information within that imminent path associated with the intermediate reference points. The vehicle may receive the APD information of the imminent path while at a location preceding the imminent path, partly in the imminent path from the perspective of the intermediate point of origination and any location along the path until the vehicle has cleared the intermediate point of destination.

The tracker fusion management server 655 may include a fusion APD module 1645 to fuse together APD information from at least one smart node identified in the search results. The fusion APD module may communicate, via communication device 1650, a portion of the APD information from any one smart node record, in some scenarios. For example, some stationary objects identified at an intersection on a path leading to the intersection that will not be traveled by the vehicle. Such APD information may be omitted from the APD information sent to the vehicle from tracker fusion management server 655. In other examples, moving objects or vehicles already heading away from the intersection along a path not to be traveled by the vehicle may be omitted from the APD information sent to the vehicle from the tracker fusion management server 655. On the other hand, moving objects or vehicles heading in the direction of an imminent intersection (relative to the vehicle's position) without a smart node, may be sent to the vehicle from the tracker fusion management server 655. By way of non-limiting example, APD information may be determined based on the vehicle path information extracted from the query by the tracker fusion management server 655. The tracker fusion management server 655 may use global coordinates of an imminent path, current global coordinates of the vehicle to extract APD information of OOIs to be encountered in the planned route of the vehicle. In the scenarios where the vehicle includes a list of smart nodes, the query processing engine 1625 may include an optional smart node extraction module 1630, denoted in dashed lines, to extract from the query information associated with those smart nodes along the imminent path for which the query was generated. The smart nodes may be associated with identifiers and coordinates.

Figure 18:
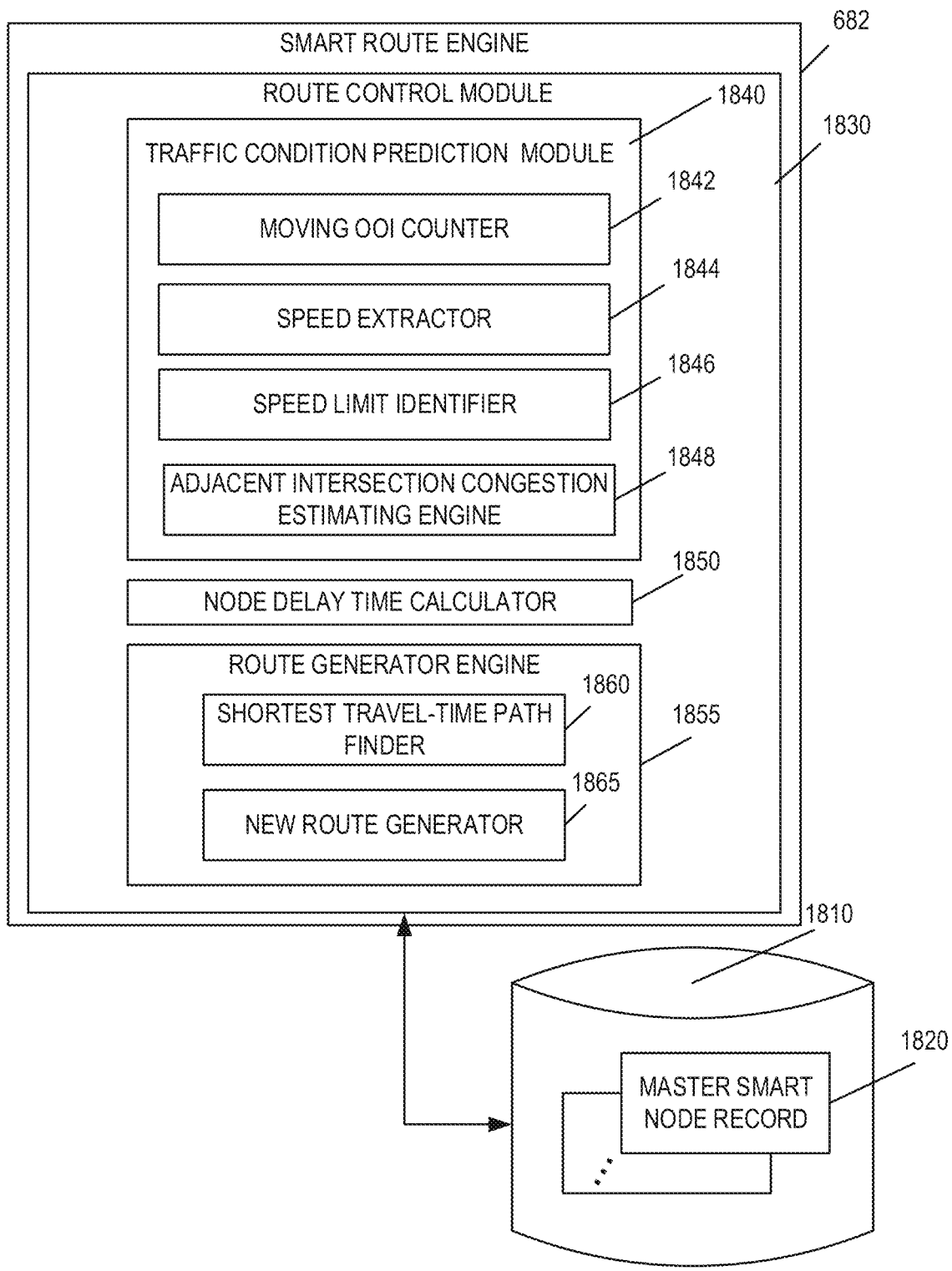
FIG. 18 illustrates a block diagram of a smart route engine control module in a network of smart nodes.

FIG. 18 illustrates a block diagram of a route control module 1830 for smart route engine 682 to control a vehicle's route in a network 800 of smart nodes. The route control module 1830 may receive, from the remote server system 155, smart node information from a master smart node record 1820 (FIG. 19) for one or more smart nodes in the network 800 (FIG. 8) of smart nodes. The master smart node record 1820 may be stored in one or more of memory 1810 and memory 673 or other memory 656 of the remote server system 155. Memory 1810 may be on-board the vehicle 105 or at the remote server system 155. The route control module 1830 may include a traffic condition prediction module 1840.

Figure 19:
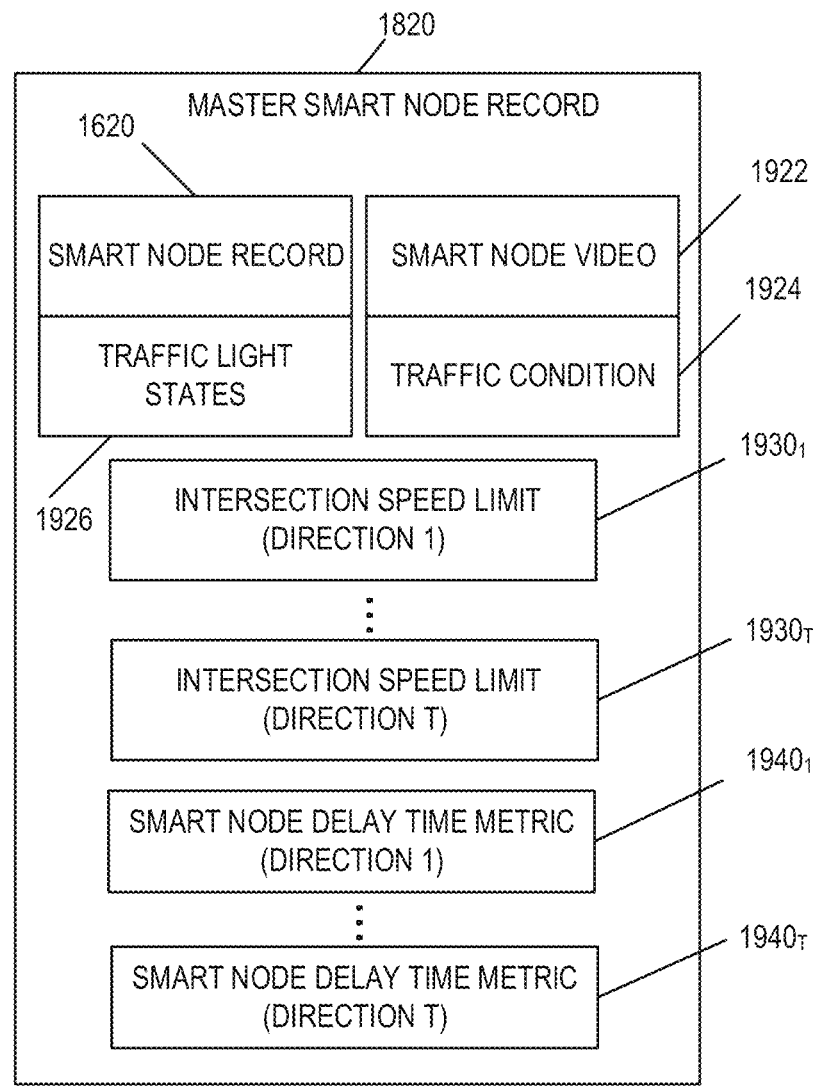
FIG. 19 illustrates a block diagram of a master smart node record.

FIG. 19 illustrates a block diagram of a master smart node record 1820. The master smart node record 1820 may include the smart node record 1620, as previously described in relation to FIG. 17. The information of the smart node record 1620 may be received from the tracker fusion management server 655 as described in relation to FIG. 6B. The master smart node record 1820 may include the video and/or still images 1922 received from each smart node via the communication unit 636 (FIG. 6A). The master smart node record 1820 may include traffic conditions information 1924 as received via from the traffic control infrastructure 679 by way of the gateway 660.

The master smart node record 1820 may include current TL states 1926 received from the traffic control infrastructure 679 via the gateway 660. The TL states 1926 may be used to predict whether there is or will be traffic congestion at a particular smart node. The master smart node record 1820 may include intersection speed limits $1930_1 \ldots 1930_T$ where T is a non-zero integer. Each intersection speed limit $1930_1 \ldots 1930_T$ may differ per road merging into or exiting from an intersection. In some scenarios, an intersection may include cross roads leading into and/or away from the intersection. The master node record 1820 may also be periodically sent to or queried by the vehicle such as for initial planning of the planned route. For example, a query for information in L meters may include different lengths for different routes between reference points such as a point of origination and a point of destination. The updated master smart node records may be helpful in planning an end to end route. However, the "L" may be smaller after a planned route is selected. The "L" in meters, for example, may be the distance for a next imminent path in the planned route. Information of the master smart node record 1820 may be stored by and determined by the vehicle 105.

Returning again to FIG. 18, the traffic condition prediction module 1840 may include a moving vehicle OOI counter 1842 to determine a number of moving vehicle OOIs detected traveling in a path or direction through an intersection with a smart node. The moving vehicle OOI counter 1842 may determine a plurality of numbers representative of traffic congestion or lack of traffic congestion. For example, the moving vehicle OOI counter 1842 may determine the number of moving vehicle OOIs traveling in each specific direction. The moving vehicle OOI counter 1842 may determine the number of moving vehicle OOIs remaining at an intersection for two or more TL state cycles. The moving OOI counter 1842 may determine the number of moving vehicle OOIs in turning lanes that remain at an intersection for two or more TL state cycles. The moving vehicle OOI counter 1842 may determine the number of moving vehicle OOIs traveling at or above the speed limit.

The traffic condition prediction module 1840 may include a speed extractor 1844 to determine a speed of each moving vehicle OOI passing in any direction of the intersection. The traffic condition prediction module 1840 may include a speed limit extractor 1846 to obtain the current speed limit for a particular prediction instantiation. The traffic condition prediction module 1840 may include an adjacent intersection congestion estimating engine 1848.

The route control module 1830 may use TL states to synchronize the received APD information to at least one TL state cycle. A TL state cycle may include an ordered arrangement of red, green, and yellow light phases, by way of non-limiting example. Each phase may have a particular duration. In some scenarios, the traffic condition prediction module 1840 may extract the APD information captured during a green phase of at least one TL state cycle to determine a level of traffic congestion at a node. During the green phase of a TL state cycle, in general, vehicles are expected to be traveling through an intersection at speeds generally close to the road's speed limit if there is little to no traffic congestions at the intersection.

The traffic condition prediction module 1840 may use the intersection speed limits $1930_1 \ldots 1930_T$ to predict or determine whether there is or will be traffic congestion at a particular smart node. In some scenarios, the vehicle may have speed limits of intersections, roads and other highways already stored for use by the vehicle navigation controller 1020. For example, a traffic congestion condition may be determined by the traffic condition prediction module 1840 based on speeds of moving vehicle OOIs being below an intersection speed limit in a particular direction such as during a green phase of the TL states 1926 of the intersection. In other embodiments, the traffic condition prediction module 1840 may track the moving vehicle OOIs to determine whether the tracked vehicle OOIs remain nearly stationary in the path for an amount of time. The amount of time may be based on whether two or more TL state cycles have been completed with limited advancement in the predicted direction of motion of the same vehicle OOIs along the path. A moving vehicle OOI is tracked based on the OOI-APD information in the smart node record.

The master smart node 1820 data may be received by the vehicle 105 from the remote server system 155. The data of the master smart node 1820 may represent network traffic information representative of a traffic condition detected within the vision range of the node and within vision ranges of a plurality of additional nodes. In this context, "network traffic information" is associated with traffic information derived from the network 800 of nodes. The "network traffic information" is different from the "traffic control information" from the traffic control infrastructure 679 associated with a traffic control system.

In other scenarios, the speed extractor 1844 of the traffic condition prediction module 1840 may identify parameters such as an amount of speed and/or speed thresholds below the intersection speed limit to detect a traffic congestion condition. Since the speeds may be changed based on a time of day, the speed extractor 1844 may track and/or update the speed thresholds for any prediction instantiation before making comparisons to determine if a vehicle OOI is moving very slow or forced to be nearly stationary, for example. In another example, in school zones, the speed limit is lowered during certain times of day. In certain highways, the speed limits may be changed based on construction or for other reasons. The term "nearly stationary" may include speeds of 5 miles per hour (MPH) or less. The term "nearly stationary" may include speeds of 10 MPH or less. Depending on the intersection, the term "nearly stationary" may include speeds of 20 MPH or less, for example.

The adjacent intersection congestion estimating engine 1848 may estimate an imminent traffic congestion condition based on traffic congestion conditions of adjacent intersection or adjacent intersections with smart nodes in the network 800. The adjacent intersection congestion estimating engine 1848 may estimate imminent traffic congestion at one or more adjacent intersections that are adjacent to a respective one smart node. For example, traffic condition prediction module 1840 may predict traffic congestion leading away from a smart node based on the time (i.e., two or more TL state cycles) a moving vehicle OOI stays in a turning lane. If a vehicle is predicted to turn left or right but remains stationary or moves at a very slow speed in a turning lane for several TL state cycles, such indication may be representative of a traffic congestion condition at an adjacent intersection or adjacent smart node in the direction of the turn.

The route control module 1830 may include a node traffic delay time calculator 1850. The node traffic delay time calculator 1850 may estimate an amount of delay of vehicle may experience traveling through a node at a particular instantiation. A node traffic delay time may be determined relative to the stored speed limit for each direction to and from the node and the time for a moving vehicle to travel to, through and from the intersection of the node. Each direction of travel to and from the intersection with a smart node may be have its own delay time metric. The smart node delay time metric $1940_1 \ldots 1940_T$ for each direction may be stored in the master smart node record 1820. As the value of the node traffic delay time increases, such increase may be a metric to predict an imminent traffic congestion levels.

The route control module 1830 may include a route generator engine 1855. In the event of an accident, for example, traffic congestion may develop at a location of the accident. The traffic congestion levels may be determined by the traffic condition prediction module 1840 at a particular location of a smart node. The route generator engine 1855 may include a shortest travel-time path finder 1860 to find one or more paths through the network of smart nodes and/or intersections without a smart node based on the calculated smart node delay time metrics $1940_1 \ldots 1940_T$ stored in the master smart node record 1820. The shortest travel-time path may estimate the travel-time based on current traffic congestion conditions through the nodes in combination with a length of the path, speed limit and delay times. The route generator engine 1855 may generate a new route 1865 of global coordinates for the remaining planned route based on a selected shortest travel-time path. The new route 1865 may be determined by the smart route engine 682 of the vehicle to update the planned route.

The route control module 1830 may find a new route for other reasons then traffic congestion. The route control module 1830 may need to change a destination location which changes the planned route. However, when scheduling a new imminent path, for example, the route control module 1830 may use a shortest travel-time path finder 1860 to find a new route using the real-time status of the traffic congestion or imminent traffic congestion. The shortest travel-time path finder 1860 may use machine algorithms that also consider at least one of tolls, highways, state laws, estimated time of arrival, traffic congestion trends, etc.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

In this document, the terms "street," "lane" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

As used in this document, the term "light" means electromagnetic radiation associated with optical frequencies, e.g., ultraviolet, visible, infrared and terahertz radiation. Example emitters of light include laser emitters and other emitters that emit converged light. In this document, the term "emitter" will be used to refer to an emitter of light, such as a laser emitter that emits infrared light.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "execution flow" refers to a sequence of functions that are to be performed in a particular order. A function refers to one or more operational instructions that cause a system to perform one or more actions. In various embodiments, an execution flow may pertain to the operation of an automated device. For example, with respect to an autonomous vehicle, a particular execution flow may be executed by the vehicle in a certain situation such as, for example, when the vehicle is stopped at a red stop light that has just turned green. For instance, this execution flow may include the functions of determining that the light is green, determining whether there are any obstacles in front of or in proximity to the vehicle and, only if the light is green and no obstacles exist, accelerating. When a subsystem of an automated device fails to perform a function in an execution flow, or when it performs a function out of order in sequence, the error may indicate that a fault has occurred or that another issue exists with respect to the execution flow.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

An "automated device monitoring system" is a set of hardware that is communicatively and/or electrically connected to various components (such as sensors) of an automated device to collect status or operational parameter values from those components. An automated device monitoring system may include or be connected to a data logging device that includes a data input (such as a wireless receiver) that is configured to receive device operation data directly or indirectly from the device's components. The monitoring system also may include a processor, a transmitter and a memory with programming instructions. A monitoring system may include a transmitter for transmitting commands and/or data to external electronic devices and/or remote servers. In various embodiments, a monitoring system may be embedded or integral with the automated device's other computing system components, or it may be a separate device that is in communication with one or more other local systems, such as, for example in the context of an autonomous vehicle, an on-board diagnostics system.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

What is claim is:

1. A system for providing navigational control information to a fleet of vehicles, comprising:
a network of nodes distributed within a geographical area, wherein:
each node is located at or near a different intersection in the geographical area, and
each node comprises:
a computer vision system with a node vision range,
a processor, and
a computer-readable storage medium comprising programming instructions that are configured to, when executed, cause the processor to process images captured by the computer vision system and generate augmented perception data that includes location data in a global coordinate system and motion data for each moving object of interest monitored in the node vision range by the computer vision system; and
a remote server system comprising:
a database of the augmented perception data generated by the network of nodes, and
a server that is configured to:
receive a query from a vehicle of the fleet of vehicles for the augmented perception data associated with an imminent path of the vehicle,
in response to the query, search the database for resultant augmented perception data associated with the imminent path, and
communicate, over a wireless communication network, the resultant augmented perception data associated with the imminent path to the vehicle, wherein the augmented perception data is to control navigation of the vehicle through one or more imminent intersections along the imminent path.

2. The system of claim 1, wherein the remote server system further comprises:
a gateway server that is configured to receive, from an external traffic control infrastructure, traffic light states for traffic light devices at each intersection with at least one traffic light device of the geographical area; and
a second database of the traffic light states for the traffic light devices in the geographical area.

3. The system of claim 2, wherein:
the gateway server is also configured to receive traffic condition information associated with roads of the geographical area monitored by the external traffic control infrastructure; and
the system further comprises a third database that includes the received traffic condition information.

4. The system of claim 3, wherein the gateway server is configured to:
receive a query from the vehicle of the fleet of vehicles for the traffic condition information associated with a planned route of the vehicle; and
search for the traffic condition information associated with the planned route in the third database, in response to the query for the traffic condition information.

5. The system of claim 2, wherein the gateway server is also configured to:
receive a query from the vehicle of the fleet of vehicles for the traffic light states for those traffic light devices along a planned route of the vehicle; and
search for the traffic light states associated with the planned route in the database of the traffic light states, in response to the query for the traffic light states.

6. The system of claim 5, wherein:
the gateway server is also configured to communicate, over the wireless communication network, to the vehicle the traffic light states associated with the planned route; and
the traffic light states are to control navigation of the vehicle along the planned route.

7. The system of claim 6, wherein the traffic light states associated with the planned route are configured to update a traffic light classifier associated with the vehicle to control navigation of the vehicle through one or more intersections along the planned route.

8. The system of claim 1, wherein:
the server is also configured to fuse the augmented perception data from adjacent nodes of the network of nodes in response to the search; and
each adjacent node has a respective different node vision range associated with the imminent path.

9. The system of claim 8, wherein the resultant augmented perception data associated with the imminent path comprises the fused augmented perception data from the adjacent nodes of the network of nodes.

10. The system of claim 1, wherein:
the remote server system is configured to communicate to the vehicle:
traffic light states associated with a planned route of the vehicle, wherein the traffic light states are to update a traffic light classifier associated with the vehicle to control navigation of the vehicle through one or more intersections along the planned route, and
traffic condition information associated with roads of the planned route, wherein the traffic condition information is to update the planned route; and
the imminent path is an un-driven portion of at least one of the planned route or updated route.

11. A method for providing navigational control information to a fleet of vehicles, the method comprising:
monitoring, by a network of nodes, intersections in a geographical area, wherein each node is located at or near a different intersection in the geographical area and comprises a computer vision system with a node vision range and a processor;
generating, by each node based on images captured by the computer vision system of the node, augmented perception data that includes location data in a global coordinate system and motion data for each moving object of interest monitored in the node vision range;
maintaining, by a remote server system in a database, the augmented perception data generated by each node of the network of nodes;
receiving, by the remote server system, a query from a vehicle of the fleet of vehicles for the augmented perception data associated with an imminent path of the vehicle;
searching the database for resultant augmented perception data associated with the imminent path, in response to the query; and
communicating, by the remote server system over a wireless communication network, the resultant augmented perception data associated with the imminent path to the vehicle, wherein the augmented perception data is to control navigation of the vehicle through one or more imminent intersections along the imminent path.

12. The method of claim 11, further comprising:
receiving, by the remote server system, traffic light states for traffic light devices at each intersection with at least one traffic light device in the geographical area from an external traffic control infrastructure; and
storing, by the remote server system, the received traffic light states for the traffic light devices of the geographical area in a second database.

13. The method of claim 12, further comprising:
receiving, by the remote server system, traffic condition information associated with roads of the geographical area monitored by the external traffic control infrastructure; and storing, by the remote server system, the received traffic condition information in a third database.

14. The method of claim 13, further comprising:
receiving, by the remote server system, a query from the vehicle of the fleet of vehicles for the traffic condition information associated with a planned route of the vehicle; and
searching, by the remote server system, for the traffic condition information associated with the planned route in the third database, in response to the query for the traffic condition information.

15. The method of claim 12, further comprising:
receiving, by the remote server system, a query from the vehicle of the fleet of vehicles for the traffic light states for those traffic light devices along a planned route of the vehicle; and
searching, by the remote server system, for the traffic light states associated with the planned route in the database of the traffic light states, in response to the query for the traffic light states.

16. The method of claim 15, further comprising:
communicating, by the remote server system, to the vehicle the traffic light states associated with in the planned route,
wherein the traffic light states are to control navigation of the vehicle along the planned route.

17. The method of claim 16, wherein the traffic light states associated with the planned route are configured to update a traffic light classifier associated with the vehicle to control navigation of the vehicle through one or more intersections along the planned route.

18. The method of claim 11, further comprising:
fusing, by the remote server system, the augmented perception data from adjacent nodes of the network of nodes in response to the search,
wherein each adjacent node had a respective different node vision range associated with the imminent path.

19. The method of claim 18, wherein the resultant augmented perception data associated with the imminent path comprises the fused augmented perception data from adjacent nodes of the network of nodes.

20. The method of claim 11, wherein:
the communicating, by the remote server system, to the vehicle further includes:
communicating traffic light states associated with in a planned route of the vehicle, wherein the traffic light states update a traffic light classifier associated with the vehicle to control navigation of the vehicle through one or more intersections along the planned route, and
communicating traffic condition information associated with roads of the planned route;
the traffic condition information is to update the planned route; and
the imminent path is an un-driven portion of at least one of the planned route or updated route.

* * * * *